(12) United States Patent
Zhu et al.

(10) Patent No.: US 11,979,601 B2
(45) Date of Patent: *May 7, 2024

(54) ENCODER-SIDE SEARCH RANGES HAVING HORIZONTAL BIAS OR VERTICAL BIAS

(71) Applicant: Microsoft Technology Licensing, LLC, Redmond, WA (US)

(72) Inventors: Lihua Zhu, Mountain View, CA (US); Yongjun Wu, Bellevue, WA (US); Gary J. Sullivan, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/158,306

(22) Filed: Jan. 23, 2023

(65) Prior Publication Data

US 2023/0239495 A1 Jul. 27, 2023

Related U.S. Application Data

(63) Continuation of application No. 17/581,446, filed on Jan. 21, 2022, now Pat. No. 11,595,679, which is a (Continued)

(51) Int. Cl.
*H04N 19/00* (2014.01)
*H04N 19/105* (2014.01)
(Continued)

(52) U.S. Cl.
CPC ........... *H04N 19/52* (2014.11); *H04N 19/105* (2014.11); *H04N 19/11* (2014.11); *H04N 19/119* (2014.11); *H04N 19/159* (2014.11); *H04N 19/162* (2014.11); *H04N 19/167* (2014.11); *H04N 19/176* (2014.11); *H04N 19/51* (2014.11);
(Continued)

(58) Field of Classification Search
CPC ...................................... H04N 19/00
See application file for complete search history.

(56) References Cited

U.S. PATENT DOCUMENTS 9,591,325 B2 3/2017 Li et al.
10,368,091 B2 7/2019 Li et al.
(Continued)

OTHER PUBLICATIONS

B. Bross, H. Schwarzand D. Marpe, "The New High-Efficiency Video Coding Standard," in SMPTE Motion Imaging Journal (Year: 2013).*

(Continued)

*Primary Examiner* — Maryam A Nasri
(74) *Attorney, Agent, or Firm* — Klarquist Sparkman, LLP

(57) ABSTRACT

Innovations in encoder-side search ranges having horizontal bias or vertical bias are described herein. For example, a video encoder determines a block vector ("BV") for a current block of a picture, performs intra prediction for the current block using the BV, and encodes the BV. The BV indicates a displacement to a region within the picture. When determining the BV, the encoder checks a constraint that the region is within a BV search range having a horizontal bias or vertical bias. The encoder can select the BV search range from among multiple available BV search ranges, e.g., depending at least in part on BV values of one or more previous blocks, which can be tracked in a histogram data structure.

20 Claims, 20 Drawing Sheets

Related U.S. Application Data continuation of application No. 14/455,856, filed on Aug. 8, 2014, now Pat. No. 11,284,103.

(60) Provisional application No. 61/954,572, filed on Mar. 17, 2014, provisional application No. 61/928,970, filed on Jan. 17, 2014.

(51) Int. Cl.

| | | |
|---|---|---|
| *H04N 19/11* | (2014.01) | |
| *H04N 19/119* | (2014.01) | |
| *H04N 19/159* | (2014.01) | |
| *H04N 19/162* | (2014.01) | |
| *H04N 19/167* | (2014.01) | |
| *H04N 19/176* | (2014.01) | |
| *H04N 19/51* | (2014.01) | |
| *H04N 19/52* | (2014.01) | |
| *H04N 19/593* | (2014.01) | |
| *H04N 19/61* | (2014.01) | |
| *H04N 19/70* | (2014.01) | |

(52) U.S. Cl.
CPC .......... *H04N 19/593* (2014.11); *H04N 19/61* (2014.11); *H04N 19/70* (2014.11)

(56) References Cited

U.S. PATENT DOCUMENTS

| | | | |
|---|---|---|---|
| 10,390,034 | B2 | 8/2019 | Zhu et al. |
| 10,469,863 | B2 | 11/2019 | Zhu et al. |
| 10,582,213 | B2 | 3/2020 | Li et al. |
| 10,785,486 | B2 | 9/2020 | Li et al. |
| 10,812,817 | B2 | 10/2020 | Li et al. |
| 11,109,036 | B2 | 8/2021 | Li et al. |
| 11,172,207 | B2 | 11/2021 | Li et al. |
| 11,284,103 | B2 | 3/2022 | Zhu et al. |
| 11,317,113 | B2 | 4/2022 | Li et al. |
| 11,334,756 | B2 | 5/2022 | Neser |
| 11,363,283 | B2 | 6/2022 | Li et al. |
| 11,388,433 | B2 | 7/2022 | Zhu et al. |
| 2013/0089134 | A1 | 4/2013 | Wang et al. |
| 2017/0127058 | A1 | 5/2017 | Misra et al. |
| 2017/0347123 | A1* | 11/2017 | Panusopone ......... H04N 19/593 |
| 2021/0360262 | A1 | 11/2021 | Li et al. |
| 2022/0030251 | A1 | 1/2022 | Li et al. |
| 2022/0201326 | A1 | 6/2022 | Li et al. |
| 2022/0295093 | A1 | 9/2022 | Zhu et al. |
| 2023/0164349 | A1 | 5/2023 | Zhu et al. |
| 2023/0209068 | A1 | 6/2023 | Li et al. |
| 2023/0353767 | A1 | 11/2023 | Li et al. |

OTHER PUBLICATIONS

Notice of Allowance dated Apr. 7, 2023, from U.S. Appl. No. 17/739,299, 9 pp.

Notice of Allowance dated Jun. 2, 2023, from Korean Patent Application No. 10-2022-7020924, 8 pp.

Office Action dated Feb. 9, 2023, from U.S. Appl. No. 17/739,299, 6 pp.

Office Action dated Feb. 20, 2023, from Korean Patent Application No. 10-2022-7020924, 6 pp.

Office Action dated Mar. 2, 2023, from U.S. Appl. No. 17/751,392, 16 pp.

U.S. Pat. U.S. Appl. No. 17/739,299, filed May 9, 2022.

Guo et al., "RCE4: Results of Test 2 on Palette Mode for Screen Content Coding", JCTVC-P0198, 3 pp. (Jan. 2014).

Sjoberg et al., "Overview of HEVC high-level syntax and reference picture management," IEEE Trans. On Circuits and Systems for Video Technology, vol. 22, No. 12, 14 pp. (Oct. 2012).

Chang et al., RCE3: Results of Subtest D.2 on Nx2N/2NxN/NxN Intra Block Copy, JCTVC-P0180, 8 pp. (Jan. 2014).

Extended European Search Report dated Mar. 5, 2024, from European Patent Application No. 24151900.8, 11 pp.

Moschetti et al., "A Nested-Multilevel Redundancy Exploitation for Fast Block Matching," *Int'l Conf. on Image Processing*, pp. 856-859 (Sep. 2000).

Notice of Allowance dated Dec. 28, 2023, from U.S. Appl. No. 18/158,295, 9 pp.

Notice of Allowance dated Jan. 10, 2024, from U.S. Appl. No. 18/178,599, 5 pp.

Office Action dated Jan. 12, 2024, from U.S. Appl. No. 18/218,796, 7 pp.

Communication pursuant to Article 94(3) EPC dated Aug. 18, 2023, from European Patent Application No. 21186125.7, 4 pp.

Communication pursuant to Article 94(3) EPC dated Oct. 26, 2023, from European Patent Application No. 14895133.8, 8 pp.

Examiner's Report dated Nov. 21, 2023, from Canadian Patent Application No. 3171803, 4 pp.

Notice of Allowance dated Sep. 5, 2023, from European Patent Application No. 15704401.7, 8 pp.

Notice of Allowance dated Oct. 4, 2023, from U.S. Appl. No. 17/751,392, 11 pp.

Office Action dated Aug. 31, 2023, from U.S. Appl. No. 18/158,295, 7 pp.

Office Action dated Sep. 15, 2023, from U.S. Appl. No. 18/178,599, 8 pp.

Office Action dated Nov. 30, 2023, from U.S. Appl. No. 17/390,570, 8 pp.

\* cited by examiner software 180 implementing one or more innovations for intra block copy prediction with asymmetric partitions, encoder-side search patterns and/or approaches to partitioning

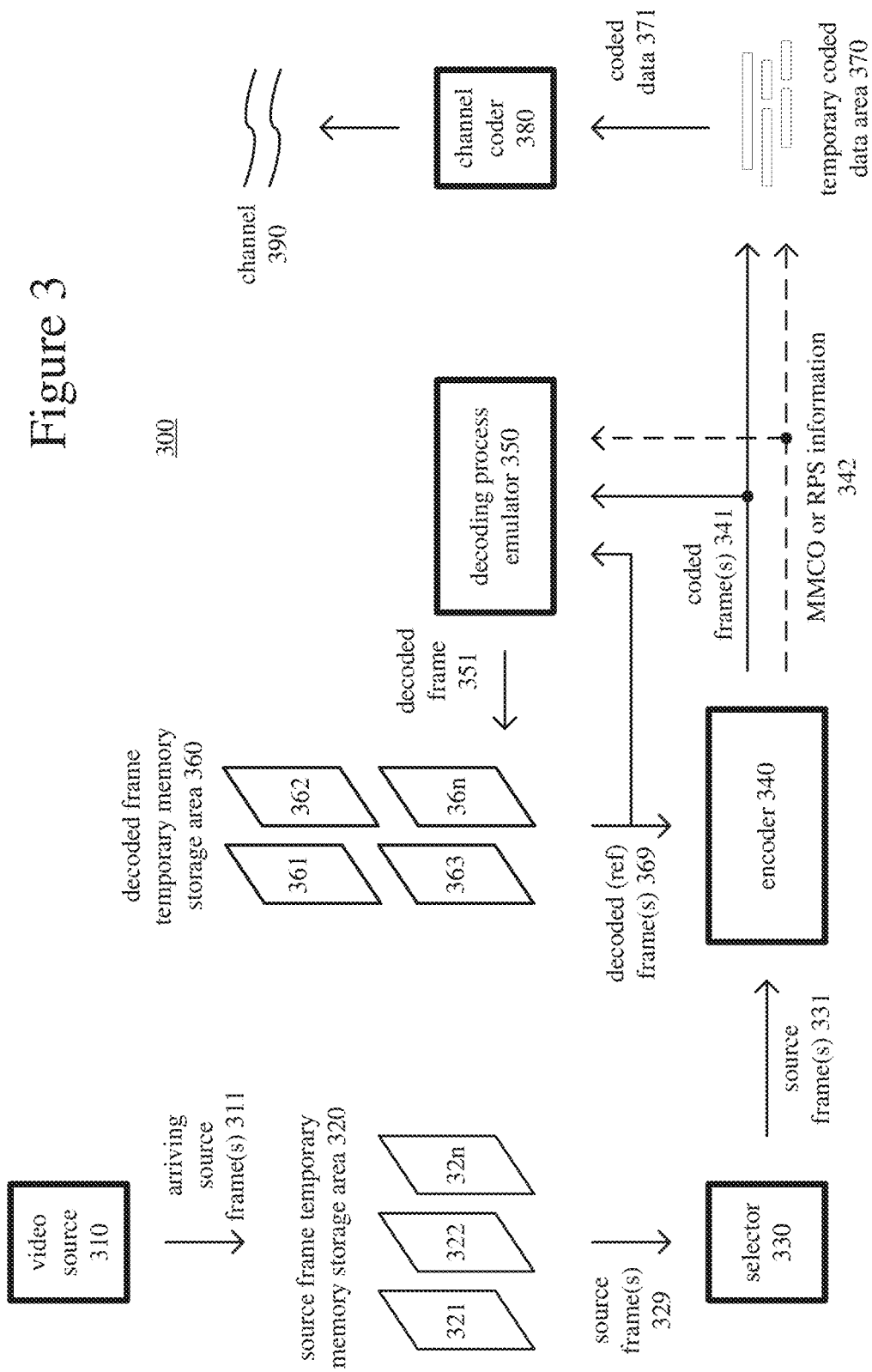

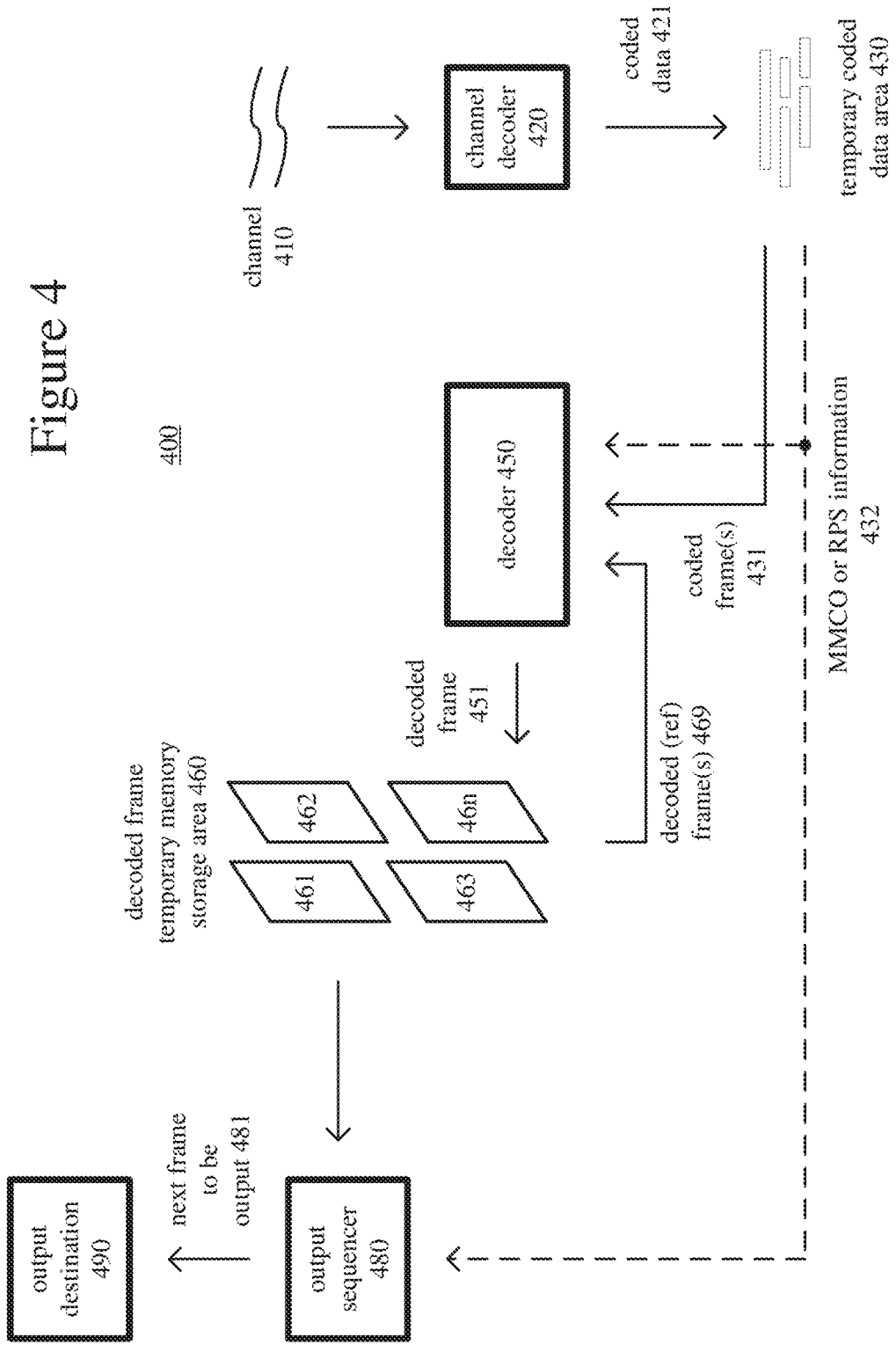

500

600 block vector (740) for current block (730) of current picture (710), indicating a displacement to a reference region (750) in the current picture (710)

block vectors (841, 842, 843, 844) indicating displacements to candidate blocks for current block (830) of current picture (810)

Figure 12
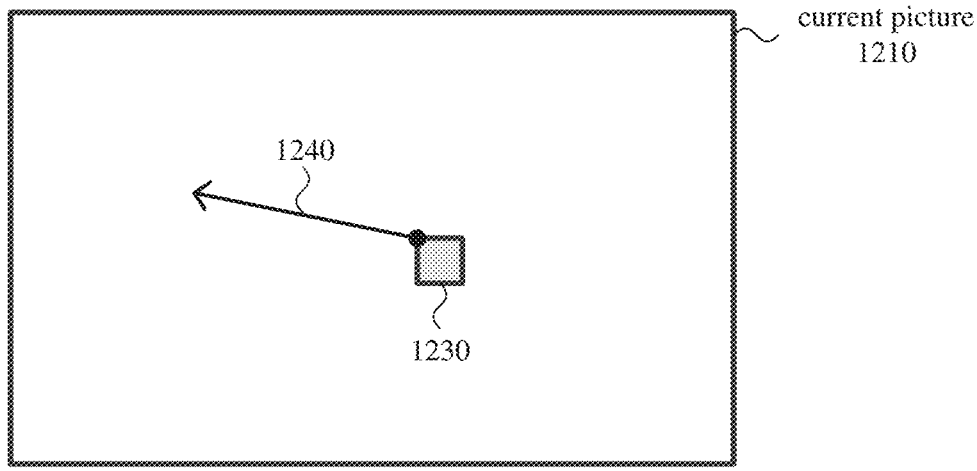
MV value (1240) for current block (1230) of current picture (1210), indicating a displacement to a reference block in reference picture (1250)
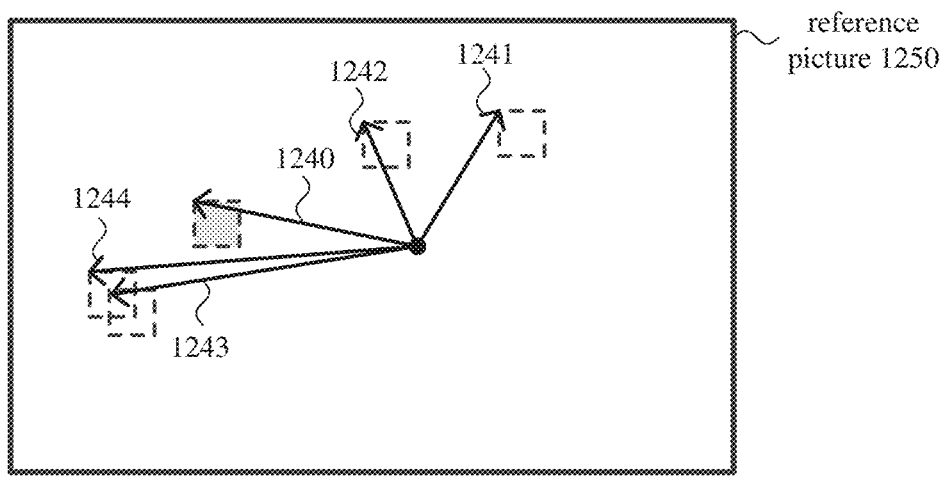
MV values (1241, 1242, 1243, 1244) indicating displacements to candidate blocks in the reference picture (1250), relative to coordinates of top-left corner of the current block (1230)

top-down approach to partitioning 2N x 2N intra BC predicted block with asymmetric partitions Figure 15
bottom-up approach to partitioning 2N x 2N block with asymmetric partitions
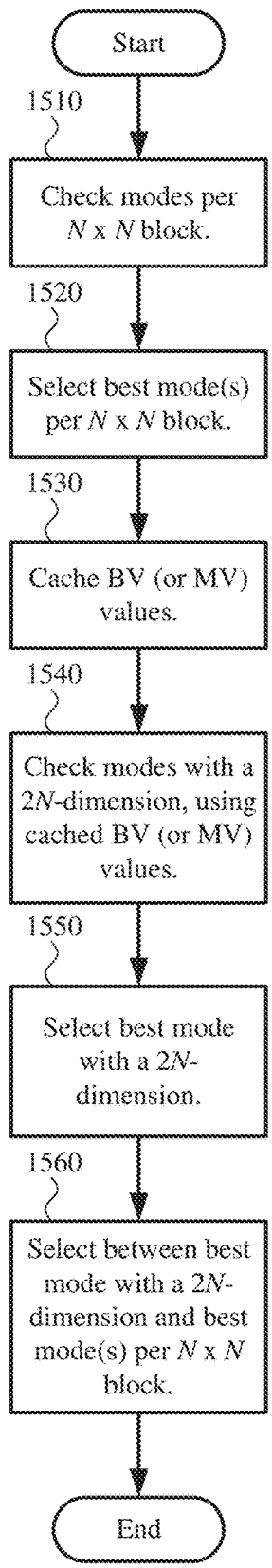
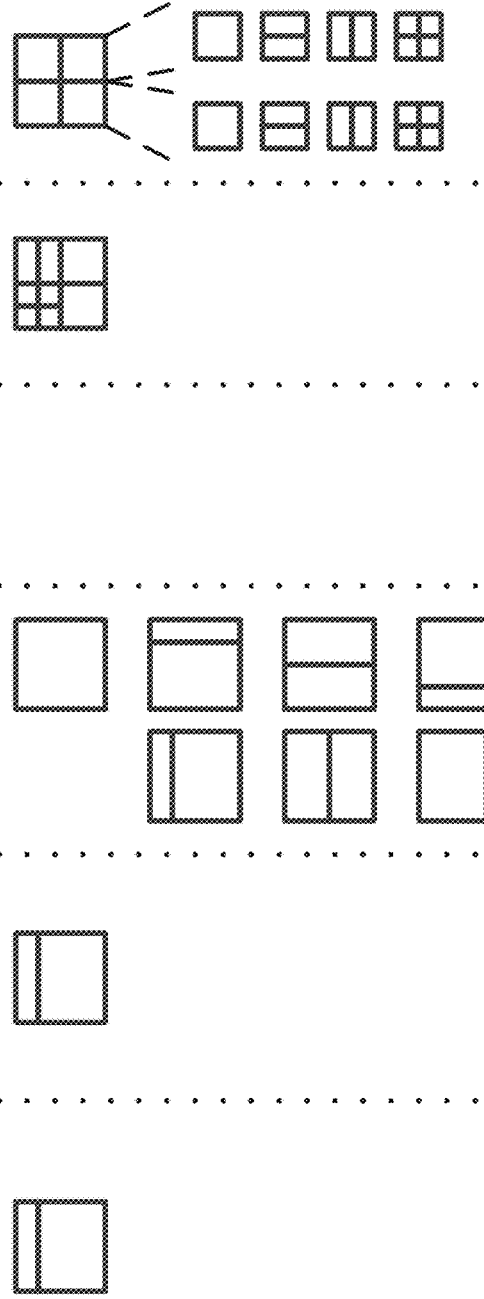

Figure 16 1600
faster bottom-up approaches to partitioning 2N x 2N block with asymmetric partitions
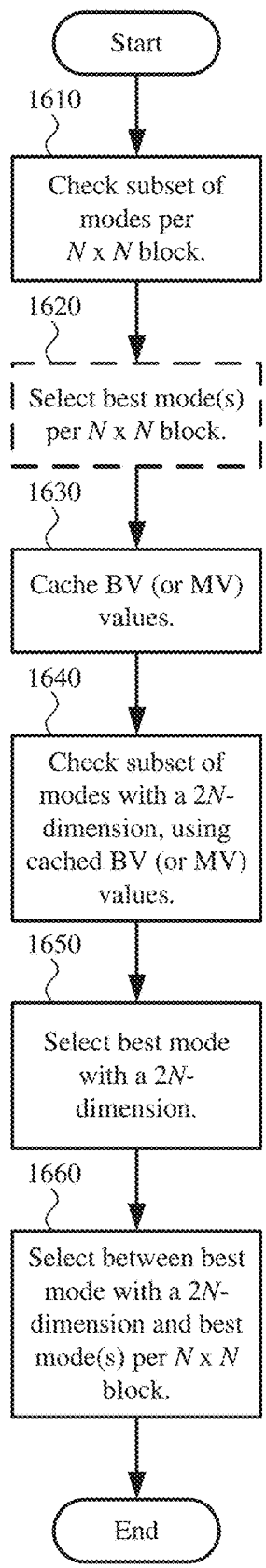
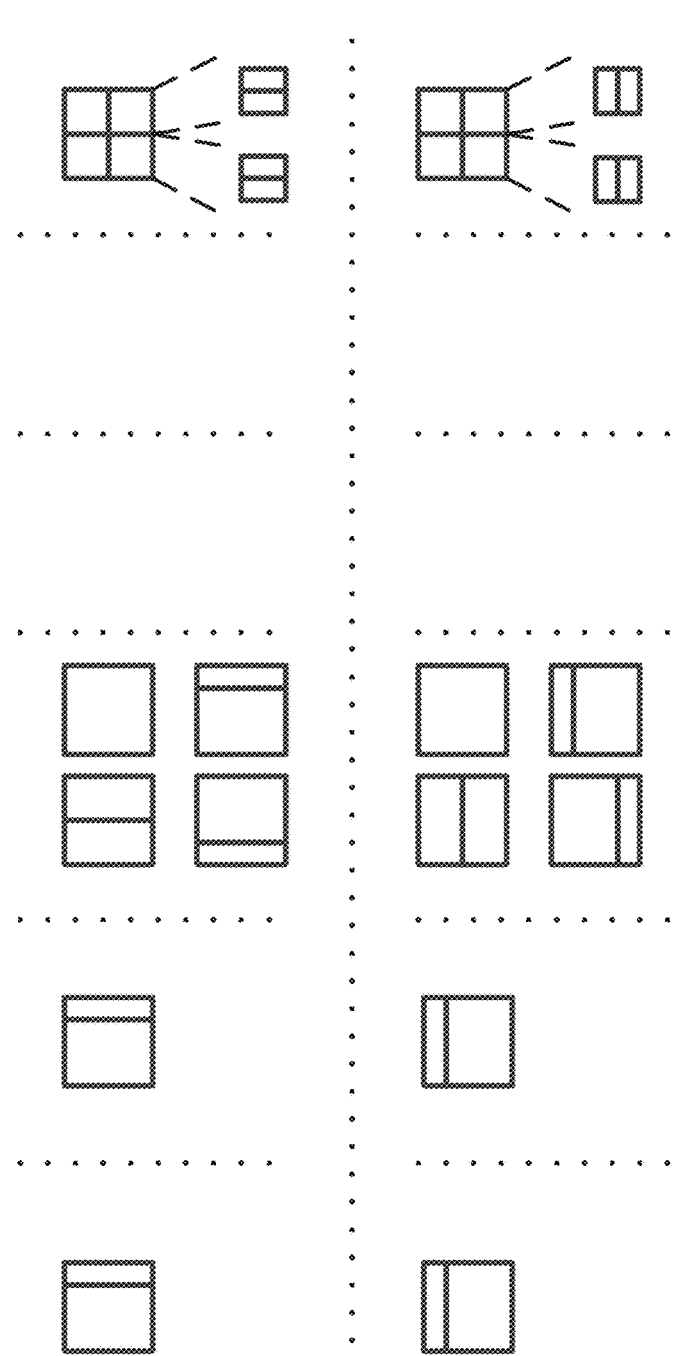

Figure 19
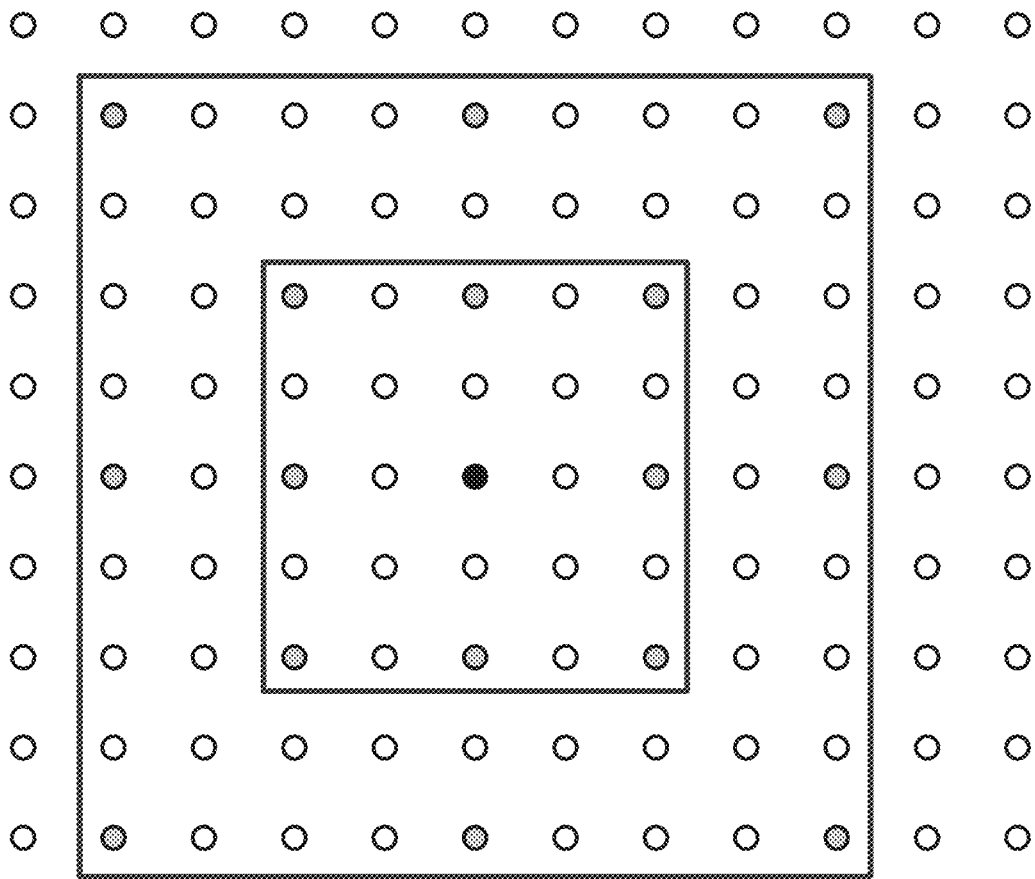
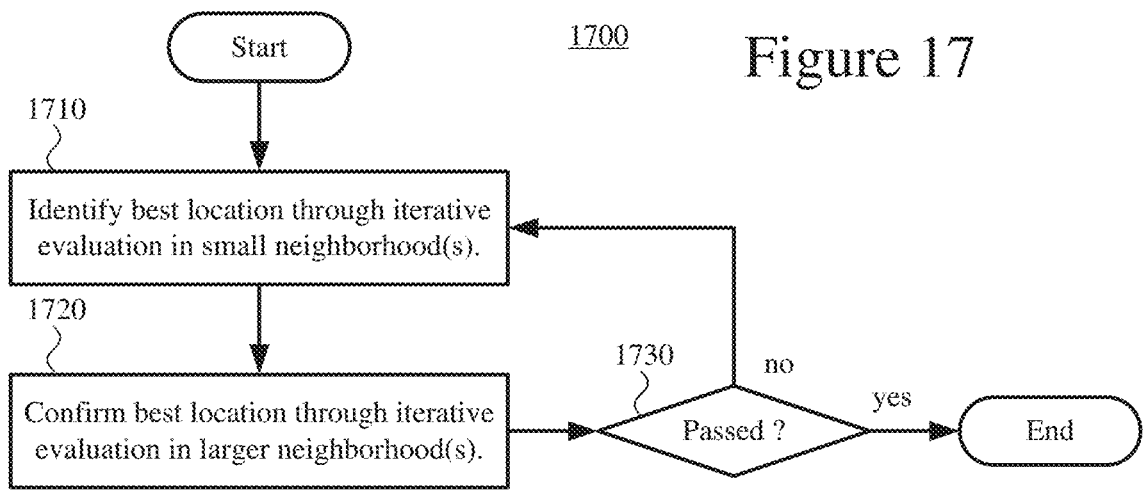
Figure 17 candidate block vectors (2142, 2144) indicating displacements to regions that
are outside of search range for current block (2130) of current frame (2110)

horizontally-biased search range (2181) with dimensions 2*N* x ¼*N* for current block (2130) of current frame (2110)

horizontally-biased search range (2182) with dimensions 2*N* x ¾*N* for current block (2130) of current frame (2110)

vertically-biased search range (2183) with dimensions ¼N x 2N for current block (2130) of current frame (2110)

vertically-biased search range (2184) with dimensions ¾N x 2N for current block (2130) of current frame (2110)

2300 z-scan order for current block and blocks that may include bottom right position of the region for a BV

ENCODER-SIDE SEARCH RANGES HAVING HORIZONTAL BIAS OR VERTICAL BIAS

CROSS-REFERENCE TO RELATED APPLICATIONS

The present application is a continuation of U.S. patent application Ser. No. 17/581,446, filed Jan. 21, 2022, which is a continuation of U.S. patent application Ser. No. 14/455,856, filed Aug. 8, 2014, the disclosure of which is hereby incorporated by reference. U.S. patent application Ser. No. 14/455,856 claims the benefit of U.S. Provisional Patent Application No. 61/928,970, filed Jan. 17, 2014, the disclosure of which is hereby incorporated by reference. U.S. patent application Ser. No. 14/455,856 also claims the benefit of U.S. Provisional Patent Application No. 61/954,572, filed Mar. 17, 2014, the disclosure of which is hereby incorporated by reference.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. Extensions to the H.265/HEVC standard (e.g., for scalable video coding/decoding, for coding/decoding of video with higher fidelity in terms of sample bit depth or chroma sampling rate, for screen capture content, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

Intra block copy ("BC") is a prediction mode under development for HEVC extensions. For intra BC prediction mode, the sample values of a current block of a picture are predicted using previously reconstructed sample values in the same picture. A block vector ("BV") indicates a displacement from the current block to a region of the picture that includes the previously reconstructed sample values used for prediction. The BV is signaled in the bitstream. Intra BC prediction is a form of intra-picture prediction—intra BC prediction for a block of a picture does not use any sample values other than sample values in the same picture.

As currently specified in the HEVC standard and implemented in some reference software for the HEVC standard, intra BC prediction mode has several problems. In particular, options for blocks sizes for intra BC prediction are too limited in many scenarios, and encoder-side decisions about block sizes and how to use intra BC prediction are not made efficiently in many scenarios.

SUMMARY

In summary, the detailed description presents innovations in intra block copy ("BC") prediction as well as innovations in encoder-side search patterns, search ranges and approaches to partitioning. For example, some of the innovations relate to use of asymmetric partitions (sometimes called "AMP") for intra BC prediction. Other innovations relate to search patterns or approaches that an encoder uses during block vector ("BV") estimation (for intra BC prediction) or motion estimation. Still other innovations relate to uses of BV search ranges that have a horizontal or vertical bias during BV estimation.

According to a first aspect of the innovations described herein, an image encoder or video encoder encodes an image or video to produce encoded data, and outputs the encoded data as part of a bitstream. As part of the encoding, the encoder performs intra BC prediction for a current block that is asymmetrically partitioned for the intra BC prediction. For example, the current block is a 2N×2N block, and the current block is partitioned into (1) a 2N×N/2 block and 2N×3N/2 block or (2) a 2N×3N/2 block and 2N×N/2 block. Or, as another example, the current block is a 2N×2N block, and the current block is partitioned into (1) an N/2×2N block and 3N/2×2N block or (2) a 3N/2×2N block and N/2×2N block. More generally, for asymmetric partitioning, the current block can be split into two partitions that have different dimensions. As part of the encoding, the encoder can also perform intra BC prediction for another block that is symmetrically partitioned for the intra BC prediction. For example, the other block is a 2N×2N block that is partitioned into (1) two 2N×N blocks, (2) two N×2N blocks, or (3) four N×N blocks, each of which can be further partitioned into two N×N/2 blocks, two N/2×N blocks or four N/2×N/2 blocks. More generally, for symmetric partitioning, the other block can be split into partitions that have identical dimensions.

According to a second aspect of the innovations described herein, an image decoder or video decoder receives encoded data as part of a bitstream and decodes the encoded data to reconstruct an image or video. As part of the decoding, the decoder performs intra BC prediction for a current block that is asymmetrically partitioned for the intra BC prediction. For example, the current block is a 2N×2N block, and the current block is partitioned into (1) a 2N×N/2 block and 2N×3N/2 block or (2) a 2N×3N/2 block and 2N×N/2 block. Or, as another example, the current block is a 2N×2N block, and the current block is partitioned into (1) an N/2×2N block and 3N/2×2N block or (2) a 3N/2×2N block and N/2×2N block. More generally, for the asymmetric partitioning, the current block can be split into two partitions that have different dimensions. As part of the decoding, the decoder can also perform intra BC prediction for another block that is symmetrically partitioned for the intra BC prediction. For example, the other block is a 2N×2N block that is partitioned into (1) two 2N×N blocks, (2) two N×2N blocks, or (3) four N×N blocks, each of which can be further partitioned into two N×N/2 blocks, two N/2×N blocks or four N/2×N/2 blocks. More generally, for symmetric partitioning, the other block can be split into partitions that have identical dimensions.

According to a third aspect of the innovations described herein, an image encoder or video encoder encodes an image or video to produce encoded data, and outputs the encoded data as part of a bitstream. As part of the encoding, the encoder computes a prediction for a current block (e.g., prediction block of a prediction unit) of a current picture. The prediction can be for motion estimation or BV estimation for intra BC prediction. In any case, the computing the prediction uses a bottom-up approach to identify partitions of the current block. In general, the partitions for the current block include two or more partitions that have different dimensions. For example, the current block is a 2N×2N block, and the bottom-up approach includes: (a) checking modes per N×N block of the 2N×2N block; (b) selecting best modes for the respective N×N blocks; (c) caching vector values for the respective N×N blocks; (d) checking modes with a 2N-dimension for the 2N×2N block, including using the cached vector values; (e) selecting a best mode with a 2N-dimension for the 2N×2N block; and (f) selecting between the best mode with a 2N-dimension for the 2N×2N block and the selected best modes for the respective N×N blocks of the 2N×2N block. Or, as another example, the current block is a 2N×2N block, and the bottom-up approach includes: (a) checking a subset of modes per N×N block of the 2N×2N block; (b) caching vector values for the respective N×N blocks; (c) checking a subset of modes with a 2N-dimension for the 2N×2N block, including using the cached vector values; (d) selecting a best mode with a 2N-dimension for the 2N×2N block; and (e) selecting between the best mode with a 2N-dimension for the 2N×2N block and best modes for the respective N×N blocks.

According to a fourth aspect of the innovations described herein, an image encoder or video encoder encodes an image or video to produce encoded data, and outputs the encoded data as part of a bitstream. As part of the encoding, the encoder computes a prediction for a current block of a current picture. The prediction can be for motion estimation or BV estimation for intra BC prediction. In any case, the computing the prediction includes (a) identifying a current best location for the prediction through iterative evaluation in a small neighborhood (e.g., locations that are immediately adjacent horizontally or vertically to the current best location) around the current best location; and (b) confirming the current best location through iterative evaluation in successively larger neighborhoods (e.g., locations in rings outside the small neighborhood) around the current best location. For example, if the current best location is worse than a location in one of the larger neighborhoods, the encoder replaces the current best location and repeats the identifying and the confirming. The confirming stage can stop if a threshold number of iterations of evaluation in successively larger neighborhoods is reached.

According to a fifth aspect of the innovations described herein, an image encoder or video encoder determines a BV for a current block of a picture, performs intra BC prediction for the current block using the BV, and encodes the BV. The BV indicates a displacement to a region within the picture. When determining the BV, the encoder checks a constraint that the region is within a BV search range having a horizontal bias or vertical bias. The encoder can select the BV search range from among multiple available BV search ranges, e.g., depending at least in part on BV values of one or more previous blocks, which can be tracked in a histogram data structure.

According to a sixth aspect of the innovations described herein, an image encoder or video encoder encodes data for a picture using intra BC prediction, and outputs the encoded data as part of a bitstream. As part of the encoding, the encoder performs BV estimation operations using a BV search range with a horizontal or vertical bias. The encoder can select the BV search range from among multiple available BV search ranges, e.g., depending at least in part on BV values of one or more previous blocks, which can be tracked in a histogram data structure.

The innovations can be implemented as part of a method, as part of a computing device adapted to perform the method or as part of a tangible computer-readable media storing computer-executable instructions for causing a computing device to perform the method. The various innovations can be used in combination or separately.

The foregoing and other objects, features, and advantages of the invention will become more apparent from the following detailed description, which proceeds with reference to the accompanying figures.

BRIEF DESCRIPTION OF THE DRAWINGS

FIG. 3 is a diagram of an example encoder system in conjunction with which some described embodiments can be implemented.

FIG. 4 is a diagram of an example decoder system in conjunction with which some described embodiments can be implemented.

FIG. 12 is a diagram illustrating motion estimation for a block of a picture.

FIG. 15 is a flowchart and accompanying diagram illustrating a bottom-up approach to partitioning an intra-BC-predicted block.

FIG. 16 is a flowchart and accompanying diagram illustrating even faster bottom-up approaches to partitioning an intra-BC-predicted block.

FIG. 17 is a flowchart illustrating a generalized technique for searching for a BV value or MV value for a block using iterative evaluation of a location in small neighborhood(s) and iterative confirmation of the location in larger neighborhood(s).

FIG. 19 is a diagram illustrating iterative confirmation of a location in one or more larger neighborhoods, when searching for a BV value or MV value for a block.

DETAILED DESCRIPTION

Figure 1:
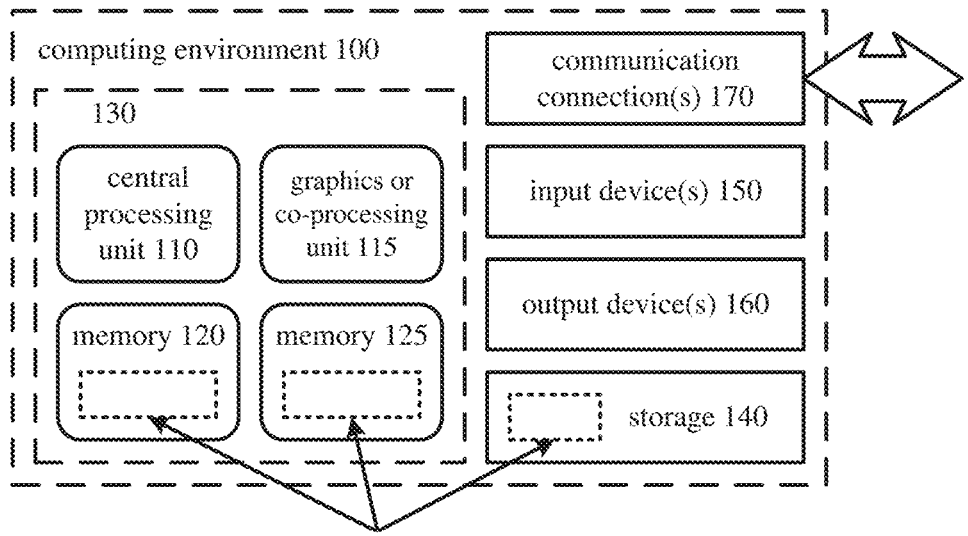
FIG. 1 is a diagram of an example computing system in which some described embodiments can be implemented.

The detailed description presents innovations in intra block copy ("BC") prediction as well as innovations in encoder-side search patterns, search ranges and approaches to partitioning. For example, some of the innovations relate to use of asymmetric partitions (sometimes called "AMP") for intra BC prediction during encoding and/or decoding. Other innovations relate to search patterns or approaches that an encoder uses during block vector ("BV") estimation (for intra BC prediction) or motion estimation. Still other innovations relate to uses of BV search ranges that have a horizontal or vertical bias during BV estimation.

Although operations described herein are in places described as being performed by a video encoder or video decoder, in many cases the operations can be performed by another type of media processing tool (e.g., image encoder or image decoder).

Some of the innovations described herein are illustrated with reference to syntax elements and operations specific to the H.265/HEVC standard. For example, reference is made to the draft version JCTVC-P1005 of the H.265/HEVC standard—"High Efficiency Video Coding (HEVC) Range Extensions Text Specification: Draft 6," JCTVC-P1005_v1, February 2014. The innovations described herein can also be implemented for other standards or formats.

Many of the innovations described herein can improve rate-distortion performance when encoding certain "artificially-created" video content such as screen capture content. In general, screen capture video (also called screen content video) is video that contains rendered text, computer graphics, animation-generated content or other similar types of content captured when rendered to a computer display, as opposed to camera-captured video content only. Screen capture content typically includes repeated structures (e.g., graphics, text characters). Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0). Common scenarios for encoding/decoding of screen capture content include remote desktop conferencing and encoding/decoding of graphical overlays on natural video or other "mixed content" video. Several of the innovations described herein are adapted for encoding of screen content video or other artificially-created video. These innovations can also be used for natural video, but may not be as effective. Other innovations described herein are effective in encoding of natural video or artificially-created video.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for intra BC prediction with asymmetric partitions and/or one or more innovations for encoder-side search patterns, search ranges having a horizontal or vertical bias and/or approaches to partitioning, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for intra BC prediction with asymmetric partitions and/or one or more innovations for encoder-side search patterns, search ranges and/or approaches to partitioning.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation. As used herein to describe a coding option, the term "best" (as in "best location," "best mode" for partitioning or "best combination") indicates a preferred coding option, compared to other coding options, with respect to estimated coding efficiency or actual coding efficiency, in terms of distortion cost, bit rate cost or some combination of distortion cost and bit rate cost. Any available distortion metric can be used for distortion cost. Any available bit rate metric can be used for bit rate cost. Other factors (such as algorithmic coding complexity, algorithmic decoding complexity, resource usage and/or delay) can also affect the decision about which coding option is "best."

II. Example Network Environments

Figure 2A:
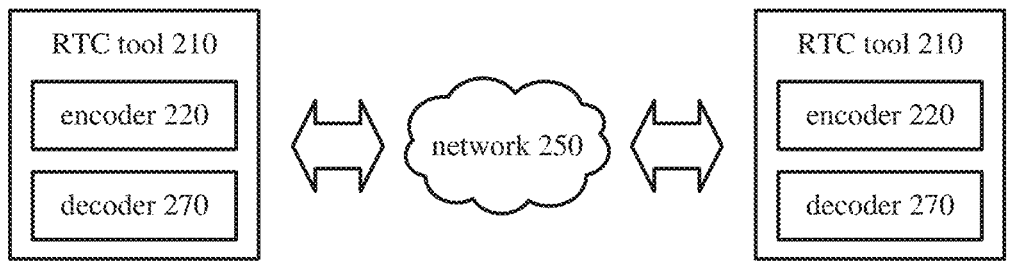
FIGS. 2a and 2b are diagrams of example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard, ISO/IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-part communication scenario. Although the network environment (201) in FIG. 2a includes two real-time communication tools (210), the network environment (201) can instead include three or more real-time communication tools (210) that participate in multi-party communication.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, screen capture module, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be adapted for encoding of a particular type of content (e.g., screen capture content). The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded using intra BC prediction mode.

The video source (310) can be a camera, tuner card, storage media, screen capture module, or other digital video source. The video source (310) produces a sequence of video frames at a frame rate of, for example, 30 frames per second. As used herein, the term "frame" generally refers to source, coded or reconstructed image data. For progressive-scan video, a frame is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) selects an individual source frame from the source frame storage area (320). The order in which frames are selected by the frame selector (330) for input to the encoder (340) may differ from the order in which the frames are produced by the video source (310), e.g., the encoding of some frames may be delayed in order, so as to allow some later frames to be encoded first and to thus facilitate temporally backward prediction. Before the encoder (340), the encoder system (300) can include a pre-processor (not shown) that performs pre-processing (e.g., filtering) of the selected frame (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Typically, before encoding, video has been converted to a color space such as YUV, in which sample values of a luma (Y) component represent brightness or intensity values, and sample values of chroma (U, V) components represent color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The chroma sample values may be sub-sampled to a lower chroma sampling rate (e.g., for YUV 4:2:0 format), or the chroma sample values may have the same resolution as the luma sample values (e.g., for YUV 4:4:4 format). Or, the video can be encoded in another format (e.g., RGB 4:4:4 format, GBR 4:4:4 format or BGR 4:4:4 format).

The encoder (340) encodes the selected frame (331) to produce a coded frame (341) and also produces memory management control operation ("MMCO") signals (342) or reference picture set ("RPS") information. The RPS is the set of frames that may be used for reference in motion compensation for a current frame or any subsequent frame. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). The MMCO/RPS information (342) indicates to a decoder which reconstructed frames may be used as reference frames, and hence should be stored in a frame storage area.

Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to provide options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of sample values for purposes of encoding and decoding.

For syntax according to the H.265/HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder. A luma CTB can contain, for example, 64×64, 32×32 or 16×16 luma sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Figure 9:
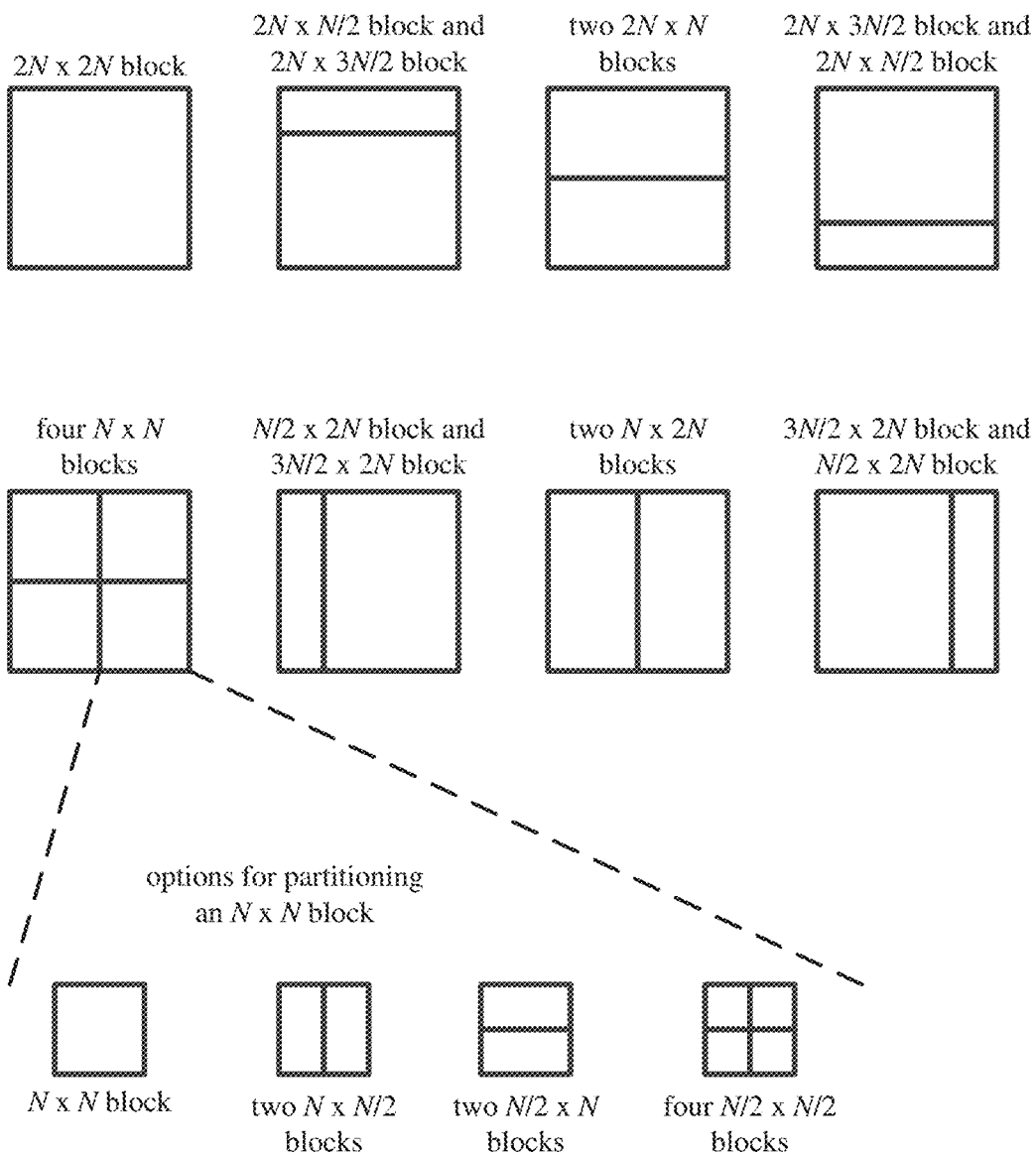
FIG. 9 is a diagram illustrating example block sizes for intra BC prediction, including some asymmetric partitions and some symmetric partitions.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. According to the H.265/HEVC standard, for an intra-predicted CU, the PU has the same size as the CU, unless the CU has the smallest size (e.g., 8×8). In that case, the CU can be split into four smaller PUs (e.g., each 4×4 if the smallest CU size is 8×8, for intra prediction) or the PU can have the smallest CU size, as indicated by a syntax element for the CU. For asymmetric partitions used in intra BC prediction, however, a CU can be split into multiple PUs as shown in FIG. 9. In this case, a larger CU (e.g., 64×64, 32×32 or 16×16) or CU of the smallest size (e.g., 8×8) can be split into multiple PUs.

A CU also has one or more transform units for purposes of residual coding/decoding, where a transform unit ("TU") has a luma transform block ("TB") and two chroma TBs. A PU in an intra-predicted CU may contain a single TU (equal in size to the PU) or multiple TUs. The encoder decides how to partition video into CTUs, CUs, PUs, TUs, etc.

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, prediction unit, residual data unit, or a CB, PB or TB, or some other set of sample values, depending on context.

Returning to FIG. 3, the encoder represents an intra-coded block of a source frame (331) in terms of prediction from other, previously reconstructed sample values in the frame (331). For intra BC prediction, an intra-picture estimator estimates displacement of a block with respect to the other, previously reconstructed sample values. An intra-frame prediction reference region is a region of sample values in the frame that are used to generate BC-prediction values for the block. The intra-frame prediction region can be indicated with a block vector ("BV") value (determined in BV estimation). Example approaches to making decisions during intra-picture encoding are described below. Depending on implementation, the encoder can perform BV estimation for a block using input sample values or reconstructed sample values (previously encoded sample values in the same picture). For additional details, see the description of BV estimation in section V.

For intra spatial prediction for a block, the intra-picture estimator estimates extrapolation of the neighboring reconstructed sample values into the block. The intra-picture estimator can output prediction information (such as BV values for intra BC prediction, or prediction mode (direction) for intra spatial prediction), which is entropy coded. An intra-frame prediction predictor applies the prediction information to determine intra prediction values.

The encoder (340) represents an inter-frame coded, predicted block of a source frame (331) in terms of prediction from reference frames. A motion estimator estimates the motion of the block with respect to one or more reference frames (369). When multiple reference frames are used, the multiple reference frames can be from different temporal directions or the same temporal direction. A motion-compensated prediction reference region is a region of sample values in the reference frame(s) that are used to generate motion-compensated prediction values for a block of sample values of a current frame. The motion estimator outputs motion information such as motion vector ("MV") information, which is entropy coded. A motion compensator applies MVs to reference frames (369) to determine motion-compensated prediction values for inter-frame prediction. Example approaches to making decisions during inter-picture encoding are described below.

The encoder can determine the differences (if any) between a block's prediction values (intra or inter) and corresponding original values. These prediction residual values are further encoded using a frequency transform (if the frequency transform is not skipped), quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., MV information, index values for BV predictors, BV differentials, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique. In some implementations, the frequency transform can be skipped. In this case, prediction residual values can be quantized and entropy coded.

An adaptive deblocking filter is included within the motion compensation loop (that is, "in-loop" filtering) in the encoder (340) to smooth discontinuities across block boundary rows and/or columns in a decoded frame. Other filtering (such as de-ringing filtering, adaptive loop filtering ("ALF"), or sample-adaptive offset ("SAO") filtering; not shown) can alternatively or additionally be applied as in-loop filtering operations.

The encoded data produced by the encoder (340) includes syntax elements for various layers of bitstream syntax. For syntax according to the H.265/HEVC standard, for example, a picture parameter set ("PPS") is a syntax structure that contains syntax elements that may be associated with a picture. A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.265/HEVC standard, a sequence parameter set ("SPS") is a syntax structure that contains syntax elements that may be associated with a sequence of pictures. A bitstream can include a single SPS or multiple SPSs. A SPS is typically signaled separate from other data for the sequence, and a syntax element in the other data indicates which SPS to use.

The coded frames (341) and MMCO/RPS information (342) (or information equivalent to the MMCO/RPS information (342), since the dependencies and ordering structures for frames are already known at the encoder (340)) are processed by a decoding process emulator (350). The decoding process emulator (350) implements some of the functionality of a decoder, for example, decoding tasks to reconstruct reference frames. In a manner consistent with the MMCO/RPS information (342), the decoding processes emulator (350) determines whether a given coded frame (341) needs to be reconstructed and stored for use as a reference frame in inter-frame prediction of subsequent frames to be encoded. If a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). In a manner consistent with the MMCO/RPS information (342), the decoding process emulator (350) manages the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Decoder Systems

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and a higher-latency decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490).

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.0|ISO/IEC 13818-1 or an internet real-time transport protocol format such as IETF RFC 3550), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, intra-frame prediction, motion-compensated inter-frame prediction, inverse quantization, inverse frequency transforms (if not skipped), and merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. An intra-frame prediction module can spatially predict sample values of a current block from neighboring, previously reconstructed sample values or, for intra BC prediction, predict sample values of a current block using previously reconstructed sample values of an intra-frame prediction region in the frame. The intra-frame prediction region can be indicated with a BV value. The decoder (450) also reconstructs prediction residual values. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency-domain data into spatial-domain data. In some implementations, the frequency transform can be skipped, in which case the inverse frequency transform is also skipped. If so, prediction residual values can be entropy decoded and inverse quantized. For an inter-frame predicted block, the decoder (450) combines reconstructed prediction residual values with motion-compensated prediction values. The decoder (450) can similarly combine prediction residual values with prediction values from intra prediction. An adaptive deblocking filter is included within the motion compensation loop in the video decoder (450) to smooth discontinuities across block boundary rows and/or columns in the decoded frame (451). Other filtering (such as de-ringing filtering, ALF, or SAO filtering; not shown) can alternatively or additionally be applied as in-loop filtering operations.

The decoded frame temporary memory storage area (460) includes multiple frame buffer storage areas (461, 462, . . . , 46n). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) identifies when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders

Figure 5A:
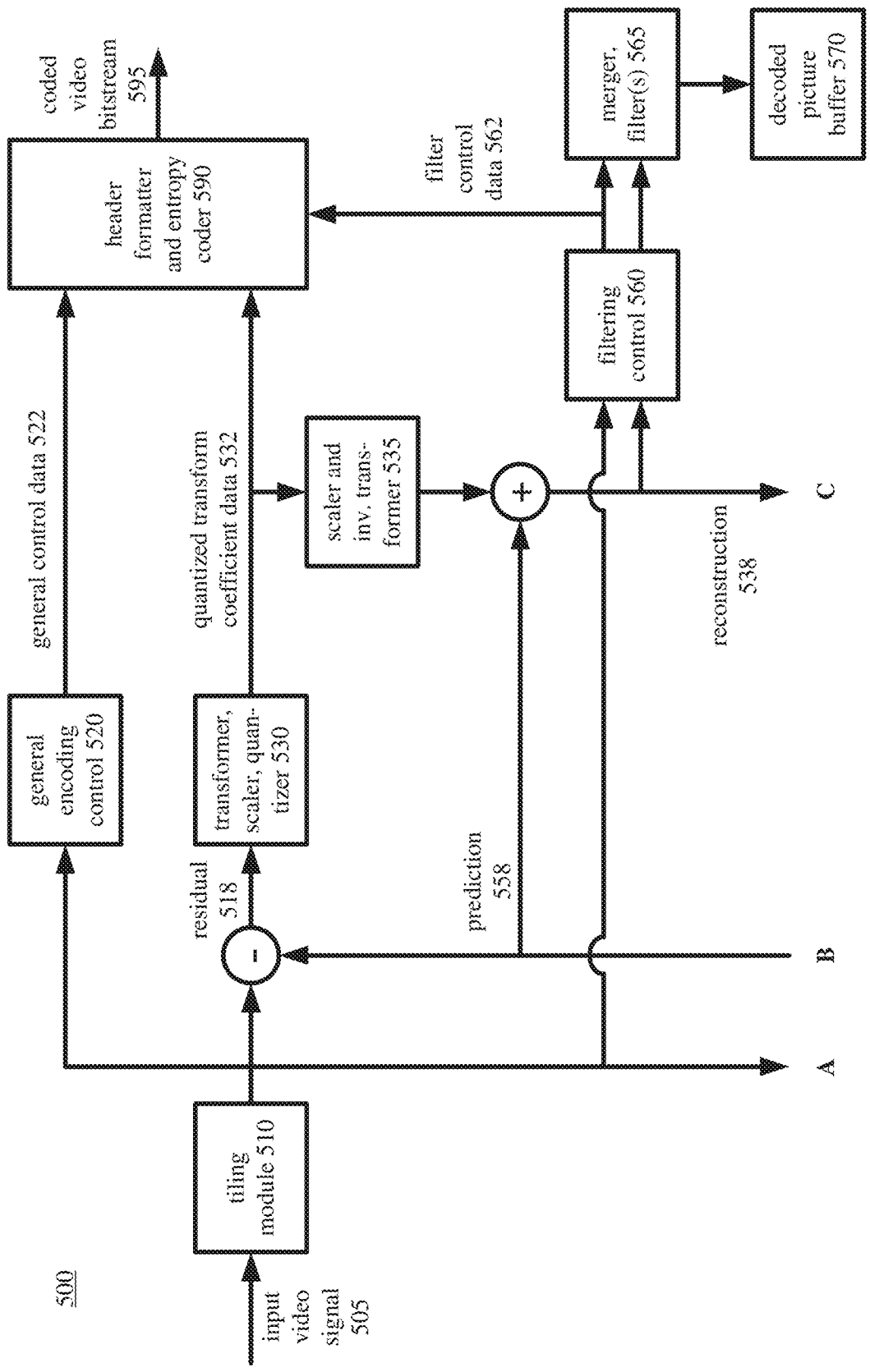
FIGS. 5a and 5b are diagrams illustrating an example video encoder in conjunction with which some described embodiments can be implemented.
Figure 5B:
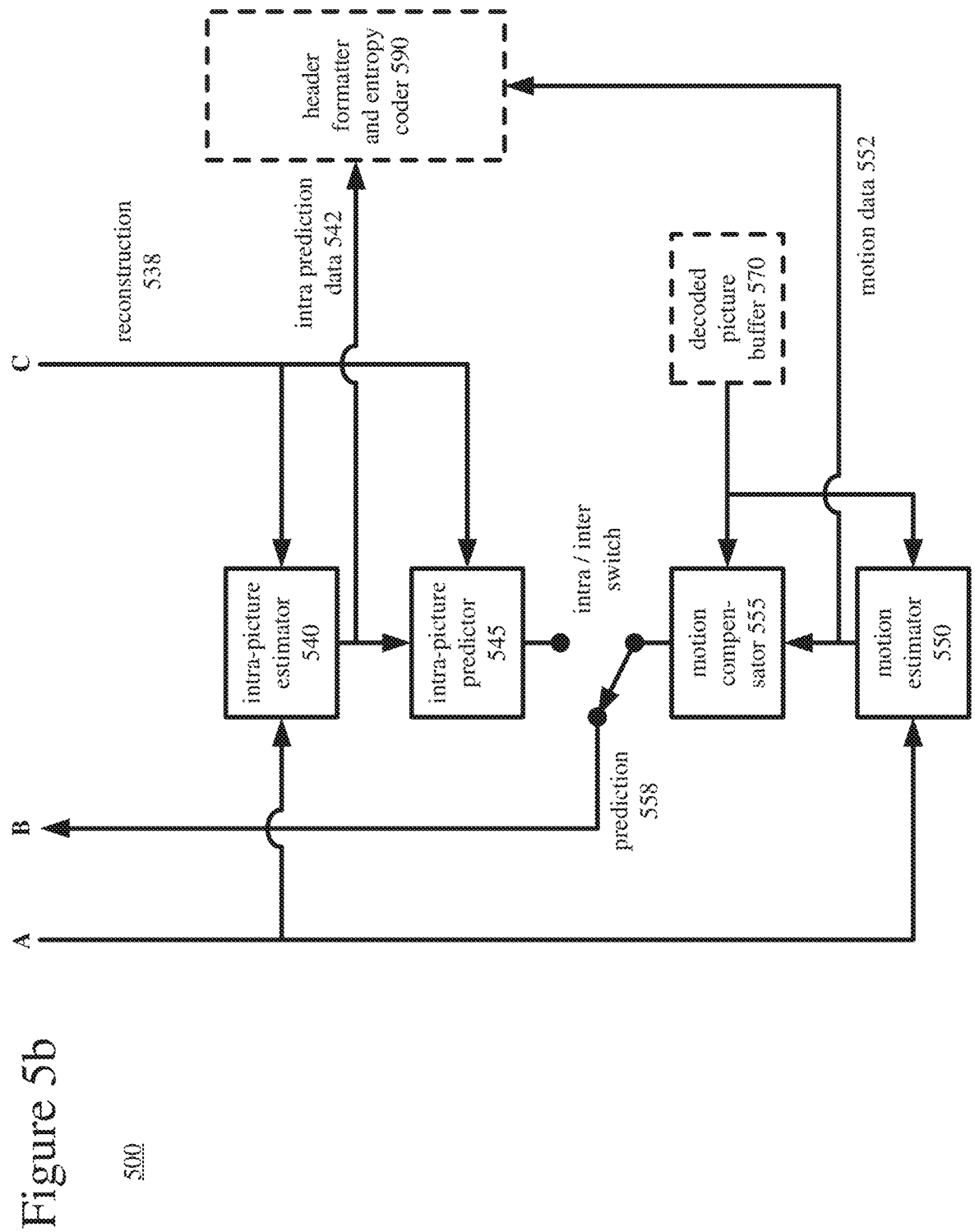

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the H.265/HEVC standard, the encoder partitions a picture into CTUs (CTBs), CUs (CBs), PUs (PBs) and TU (TBs). Blocks (e.g., CUs) can be asymmetrically partitioned into smaller blocks (e.g., PUs) for purposes of intra BC prediction, as shown in FIG. 9.

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region. In H.265/HEVC implementations, the encoder (500) partitions a picture into one or more slices, where each slice includes one or more slice segments.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, the general encoding control (520) can manage decisions about partitioning during encoding. More generally, the general encoding control (520) can decide whether and how to use intra BC prediction during encoding. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates the motion of blocks of sample values of a current picture of the input video signal (505) with respect to one or more reference pictures. The decoded picture buffer (570) buffers one or more reconstructed previously coded pictures for use as reference pictures. When determining how to partition blocks for motion estimation, the motion estimator (550) can apply a top-down approach or bottom-up approach, as described below. The motion estimator (550) can use a search pattern as described below or other search pattern.

When multiple reference pictures are used, the multiple reference pictures can be from different temporal directions or the same temporal direction. The motion estimator (550) produces as side information motion data (552) such as MV data, merge mode index values, and reference picture selection data. The motion data (552) is provided to the header formatter/entropy coder (590) as well as the motion compensator (555).

The motion compensator (555) applies MVs to the reconstructed reference picture(s) from the decoded picture buffer (570). The motion compensator (555) produces motion-compensated predictions for the current picture.

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block of the current picture from neighboring, previously reconstructed sample values of the current picture. Or, for intra BC prediction using BV values, the intra-picture estimator (540) estimates displacement of the sample values of the current block to different candidate reference regions within the current picture. When determining how to partition blocks for BV estimation (and intra BC prediction), the intra-picture estimator (540) can apply a top-down approach or bottom-up approach, as described below. The intra-picture estimator (540) can use a search pattern as described below or other search pattern. For intra BC prediction, the intra-prediction estimator (540) can constrain the BV selection process using one or more constraints described below.

Depending on implementation, the encoder can perform BV estimation for the current block using input sample values, reconstructed sample values before in-loop filtering, or reconstructed sample values after in-loop filtering. In general, by using input sample values or unfiltered, reconstructed sample values for BV estimation, the encoder can avoid a sequential-processing bottleneck (which may result from filtering reconstructed sample values of a reference region before BV estimation/intra BC prediction). On the other hand, storing the unfiltered, reconstructed sample values uses additional memory. Also, if in-loop filtering is applied prior to BV estimation, there may be a region of influence that overlaps between the filtering process that will be applied after the current block region is decoded and the region being used for BV estimation/intra BC prediction. In such a case, the BV estimation/intra BC prediction would be applied before that aspect of the filtering operation. In some implementations, the encoder can apply some in-loop filtering operations before BV estimation/intra BC prediction, and perform additional or alternative filtering in a later processing stage.

Or, for an intra-picture dictionary coding mode, pixels of a block are encoded using previous sample values stored in a dictionary or other location, where a pixel is a set of co-located sample values (e.g., an RGB triplet or YUV triplet). For example, the encoder (500) can calculate hash values of previously reconstructed sample values (e.g., groupings of 1 pixel, 2 pixels, 4 pixels, 8 pixels, and so on) and compare those hash values to a hash value of a set of current pixels being encoded. Matches of length one or more can be identified in the previously reconstructed sample values based on the hash comparison. The current pixel(s) (or sample values) can be encoded in various 1-D and pseudo 2-D dictionary modes, using an offset that identifies a location within previous pixels (e.g., in a dictionary) and a length indicating a number of pixels being predicted from that offset. Typically, no residual is calculated for a block encoded in intra-picture dictionary coding mode.

The intra-picture estimator (540) produces as side information intra prediction data (542), such as information indicating whether intra prediction uses spatial prediction, intra BC prediction or a dictionary mode, prediction mode direction (for intra spatial prediction), BV values (for intra BC prediction) and offsets and lengths (for dictionary mode). The intra prediction data (542) is provided to the header formatter/entropy coder (590) as well as the intra-picture predictor (545).

According to the intra prediction data (542), the intra-picture predictor (545) spatially predicts sample values of a current block of the current picture from neighboring, previously reconstructed sample values of the current picture. Or, for intra BC prediction, the intra-picture predictor (545) predicts the sample values of the current block using previously reconstructed sample values of an intra-picture prediction reference region, which is indicated by a BV value for the current block. In some cases, the BV value can be a BV predictor (predicted BV value). In other cases, the BV value can be different than its predicted BV value, in which case a BV differential indicates the difference between the predicted BV value and BV value. Or, for intra-picture dictionary mode, the intra-picture predictor (545) reconstructs pixels using offsets and lengths.

The intra/inter switch selects whether the prediction (558) for a given block will be a motion-compensated prediction or intra-picture prediction.

For non-dictionary mode, when residual coding is not skipped, the difference (if any) between a block of the prediction (558) and a corresponding part of the original current picture of the input video signal (505) provides values of the residual (518). During reconstruction of the current picture, when residual values have been encoded/signaled, reconstructed residual values are combined with the prediction (558) to produce an approximate or exact reconstruction (538) of the original content from the video signal (505). (In lossy compression, some information is lost from the video signal (505).)

In the transformer/scaler/quantizer (530), for non-dictionary modes, when a frequency transform is not skipped, a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (558) is null), producing blocks of frequency transform coefficients. The transformer/scaler/quantizer (530) can apply a transform with variable block sizes. In this case, the transformer/scaler/quantizer (530) can determine which block sizes of transforms to use for the residual values for a current block. The scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis or other basis. The quantized transform coefficient data (532) is provided to the header formatter/entropy coder (590). If the frequency transform is skipped, the scaler/quantizer can scale and quantize the blocks of prediction residual data (or sample value data if the prediction (558) is null), producing quantized values that are provided to the header formatter/entropy coder (590).

In the scaler/inverse transformer (535), for non-dictionary modes, a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the encoder (500) combines reconstructed residual values with values of the prediction (558) (e.g., motion-compensated prediction values, intra-picture prediction values) to form the reconstruction (538). When residual values have not been encoded/signaled, the encoder (500) uses the values of the prediction (558) as the reconstruction (538).

For intra-picture prediction, the values of the reconstruction (538) can be fed back to the intra-picture estimator (540) and intra-picture predictor (545). The values of the reconstruction (538) can be used for motion-compensated prediction of subsequent pictures. The values of the reconstruction (538) can be further filtered. A filtering control (560) determines how to perform deblock filtering and SAO filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the encoder (500), and the encoder (500) may provide syntax within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552) and filter control data (562). For the motion data (552), the header formatter/entropy coder (590) can select and entropy code merge mode index values, or a default MV predictor can be used. In some cases, the header formatter/entropy coder (590) also determines MV differentials for MV values (relative to MV predictors for the MV values), then entropy codes the MV differentials, e.g., using context-adaptive binary arithmetic coding. For the intra prediction data (542), a BV value can be encoded using BV prediction. BV prediction can use a default BV predictor (e.g., from one or more neighboring blocks). When multiple BV predictors are possible, a BV predictor index can indicate which of the multiple BV predictors to use for BV prediction. The header formatter/entropy coder (590) can select and entropy code BV predictor index values (for intra BC prediction), or a default BV predictor can be used. In some cases, the header formatter/entropy coder (590) also determines BV differentials for BV values (relative to BV predictors for the BV values), then entropy codes the BV differentials, e.g., using context-adaptive binary arithmetic coding.

The header formatter/entropy coder (590) provides the encoded data in the coded video bitstream (595). The format of the coded video bitstream (595) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of an encoder (500) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders

Figure 6:
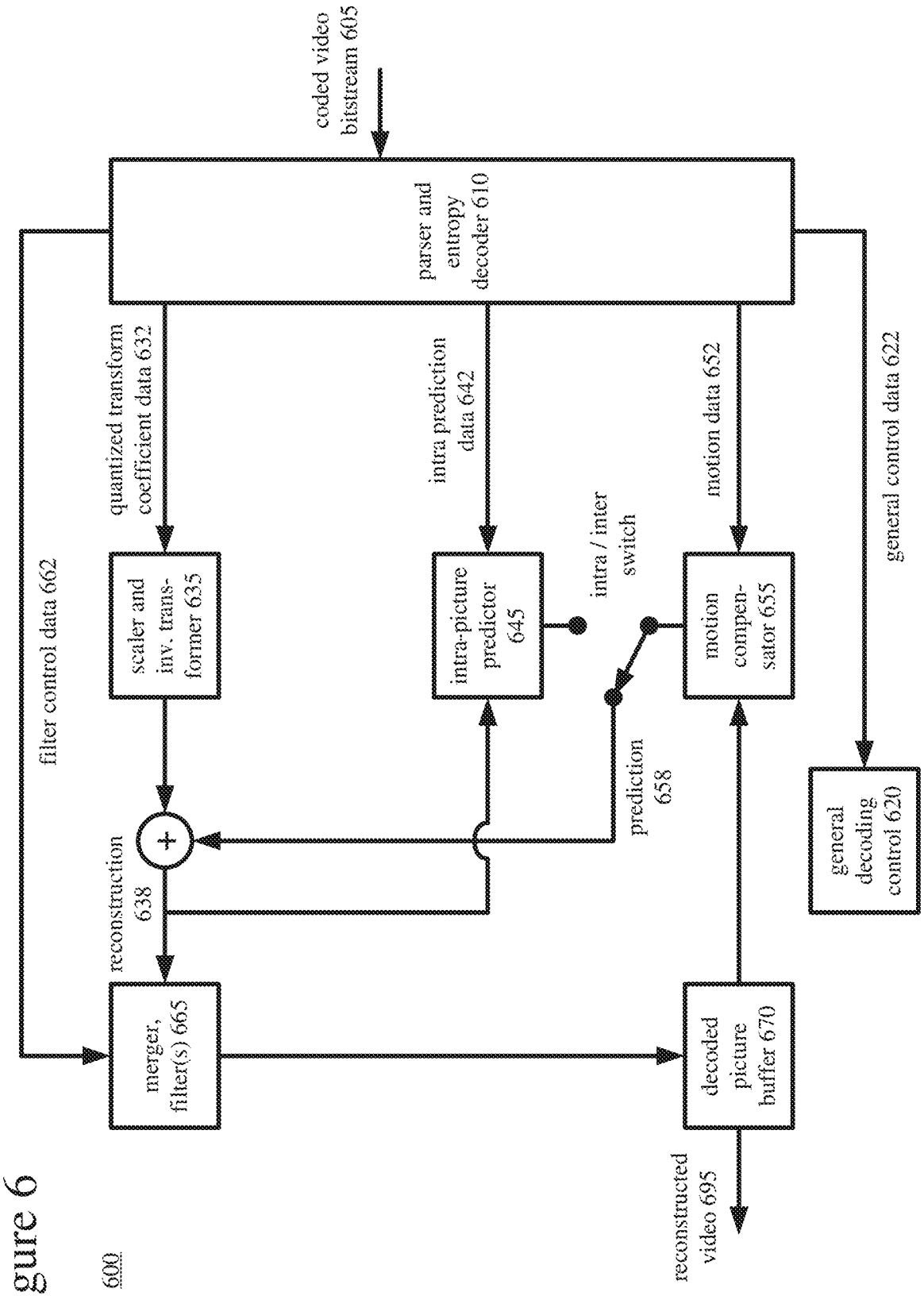
FIG. 6 is a diagram illustrating an example video decoder in conjunction with which some described embodiments can be implemented.

FIG. 6 is a block diagram of a generalized decoder (600) in conjunction with which some described embodiments may be implemented. The decoder (600) receives encoded data in a coded video bitstream (605) and produces output including pictures for reconstructed video (695). The format of the coded video bitstream (605) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

The decoder (600) is block-based and uses a block format that depends on implementation. Blocks may be further sub-divided at different stages. For example, a picture can be divided into 64×64 blocks, 32×32 blocks or 16×16 blocks, which can in turn be divided into smaller blocks of sample values. In implementations of decoding for the HEVC standard, a picture is partitioned into CTUs (CTBs), CUs (CBs), PUs (PBs) and TU (TBs). Blocks (e.g., CUs) can be asymmetrically partitioned into smaller blocks (e.g., PUs) for purposes of intra BC prediction, as shown in FIG. 9.

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). As a result of parsing and entropy decoding, the parser/entropy decoder (610) produces general control data (622), quantized transform coefficient data (632), intra prediction data (642), motion data (652) and filter control data (662). For the intra prediction data (642), if BV predictor index values are signaled, the parser/entropy decoder (610) can entropy decode the BV predictor index values, e.g., using context-adaptive binary arithmetic decoding. In some cases, the parser/entropy decoder (610) also entropy decodes BV differentials for BV values (e.g., using context-adaptive binary arithmetic decoding), then combines the BV differentials with corresponding BV predictors to reconstruct the BV values. In other cases, the BV differential is omitted from the bitstream, and the BV value is simply the BV predictor (e.g., indicated with the BV predictor index value).

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding.

If the current picture is predicted using inter-picture prediction, a motion compensator (655) receives the motion data (652), such as MV data, reference picture selection data and merge mode index values. The motion compensator (655) applies MVs to the reconstructed reference picture(s) from the decoded picture buffer (670). The motion compensator (655) produces motion-compensated predictions for inter-coded blocks of the current picture. The decoded picture buffer (670) stores one or more previously reconstructed pictures for use as reference pictures.

In a separate path within the decoder (600), the intra-frame prediction predictor (645) receives the intra prediction data (642), such as information indicating whether intra prediction uses spatial prediction, intra BC prediction or dictionary mode, and prediction mode direction (for intra spatial prediction), BV values (for intra BC prediction) or offsets and lengths (for dictionary mode). For intra spatial prediction, using values of a reconstruction (638) of the current picture, according to prediction mode data, the intra-picture predictor (645) spatially predicts sample values of a current block of the current picture from neighboring, previously reconstructed sample values of the current picture. Or, for intra BC prediction using BV values, the intra-picture predictor (645) predicts the sample values of the current block using previously reconstructed sample values of an intra-frame prediction region, which is indicated by a BV value for the current block. Or, for intra-picture dictionary mode, the intra-picture predictor (645) reconstructs pixels using offsets and lengths.

The intra/inter switch selects values of a motion-compensated prediction or intra-picture prediction for use as the prediction (658) for a given block. For example, when HEVC syntax is followed, the intra/inter switch can be controlled based on a syntax element encoded for a CU of a picture that can contain intra-predicted CUs and inter-predicted CUs. When residual values have been encoded/signaled, the decoder (600) combines the prediction (658) with reconstructed residual values to produce the reconstruction (638) of the content from the video signal. When residual values have not been encoded/signaled, the decoder (600) uses the values of the prediction (658) as the reconstruction (638).

To reconstruct the residual when residual values have been encoded/signaled, the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof). If the frequency transform was skipped during encoding, the inverse frequency transform is also skipped. In this case, the scaler/inverse quantizer can perform inverse scaling and inverse quantization on blocks of prediction residual data (or sample value data), producing reconstructed values.

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the frames. Other filtering (such as de-ringing filtering or ALF; not shown) can alternatively or additionally be applied. Tile boundaries can be selectively filtered or not filtered at all, depending on settings of the decoder (600) or a syntax indication within the encoded bitstream data. The decoded picture buffer (670) buffers the reconstructed current picture for use in subsequent motion-compensated prediction.

The decoder (600) can also include a post-processing filter. The post-processing filter (608) can include deblock filtering, de-ringing filtering, adaptive Wiener filtering, film-grain reproduction filtering, SAO filtering or another kind of filtering. Whereas "in-loop" filtering is performed on reconstructed sample values of frames in a motion compensation loop, and hence affects sample values of reference frames, the post-processing filter (608) is applied to reconstructed sample values outside of the motion compensation loop, before output for display.

Depending on implementation and the type of decompression desired, modules of the decoder (600) can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Intra Block Copy Prediction with Asymmetric Partitions

This section presents examples of asymmetric partitions for intra-BC-predicted blocks. Using asymmetric partitions can allow an encoder to adapt the partitions to strongly defined but irregular image patterns within blocks, which are common in text, Web pages, and other parts of screen capture video and other artificially-created video.

A. Intra BC Prediction Mode and BV Values—Introduction.

For intra BC prediction, the sample values of a current block of a picture are predicted using sample values in the same picture. A BV value indicates a displacement from the current block to a region of the picture (the "reference region") that includes the sample values used for prediction. The reference region provides predicted values for the current block. The sample values used for prediction are previously reconstructed sample values, which are thus available at the encoder during encoding and at the decoder during decoding. The BV value is signaled in the bitstream, and a decoder can use the BV value to determine the reference region of the picture to use for prediction, which is also reconstructed at the decoder. Intra BC prediction is a form of intra-picture prediction—intra BC prediction for a block of a picture does not use any sample values other than sample values in the same picture.

Figure 7:
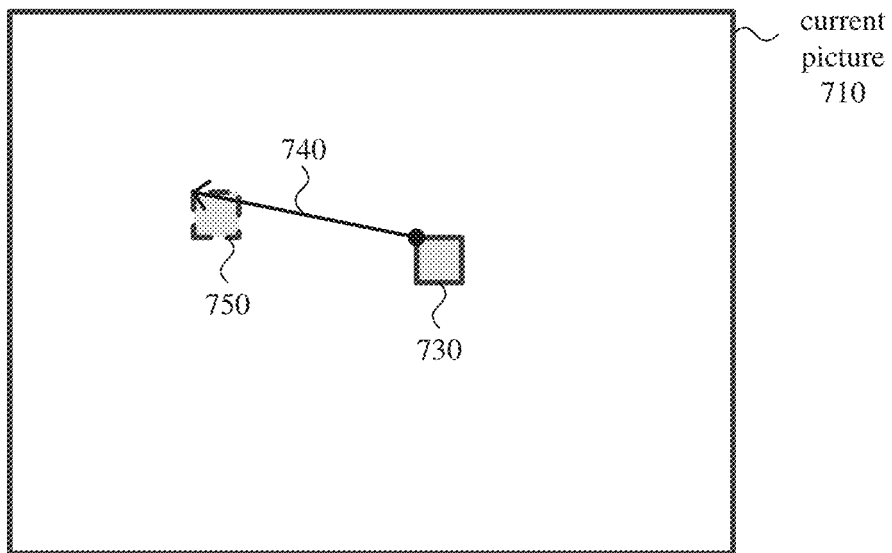
FIGS. 7 and 8 are diagrams illustrating intra BC prediction for a block of a picture and candidate blocks for the block in block matching.

FIG. 7 illustrates intra BC prediction for a current block (730) of a current picture (710). The current block can be a coding block ("CB") of a coding unit ("CU"), prediction block ("PB") of a prediction unit ("PU"), transform block ("TB") of a transform unit ("TU") or other block. The size of the current block can be 64×64, 32×32, 16×16, 8×8 or some other size. More generally, the size of the current block is m×n, where each of m and n is a whole number, and where m and n can be equal to each other or can have different values. Thus, the current block can be square or rectangular. Alternatively, the current block can have some other shape.

The BV (740) indicates a displacement (or offset) from the current block (730) to a reference region (750) of the picture that includes the sample values used for prediction. The reference region (750) indicated by the BV (740) is sometimes termed the "matching block" for the current block (730). The matching block can be identical to the current block (730), or it can be an approximation of the current block (730). Suppose the top-left position of a current block is at position $(x_0, y_0)$ in the current picture, and suppose the top-left position of the reference region is at position $(x_1, y_1)$ in the current picture. The BV indicates the displacement $(x_1-x_0, y_1-y_0)$. For example, if the top-left position of the current block is at position (256, 128), and the top-left position of the reference region is at position (126, 104), the BV value is (−130, −24). In this example, a negative horizontal displacement indicates a position to the left of the current block, and a negative vertical displacement indicates a position above the current block.

Figure 8:
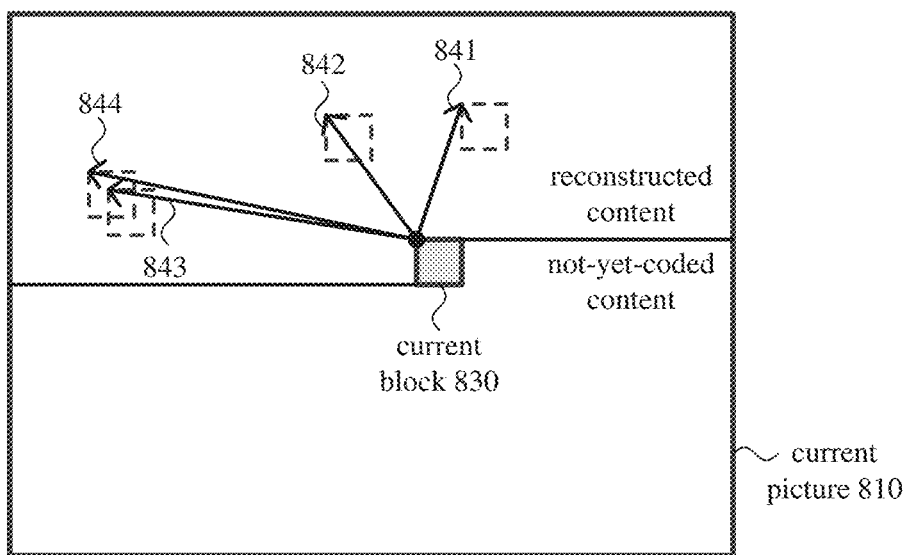

Intra BC prediction can improve coding efficiency by exploiting redundancy (such as repeated patterns inside a picture) using BC operations. Finding a matching block for a current block can be computationally complex and time consuming, however, considering the number of candidate blocks that the encoder may evaluate. FIG. 8 shows some of the candidate blocks for a current block (830) of a current picture (810) in block matching operations. Four BVs (841, 842, 843, 844) indicate displacements for four candidate blocks. The candidate blocks can be anywhere within the reconstructed content of the current picture (810). (Blocks are generally coded from left-to-right, then from top-to-bottom.) A candidate block can overlap with other candidate blocks, as shown for the candidate blocks indicated by the BVs (843, 844).

In some example implementations, the intra-predicted region (850) is constrained to be within the same slice and tile as the current block (830). Such intra BC prediction does not use sample values in other slices or tiles. The location of the intra-predicted region (850) may be subject to one or more other constraints (e.g., for search range, regarding use of reconstructed sample values of inter-coded blocks). Alternatively, the location of the intra-predicted region (850) is not constrained (that is, full search range) within the reconstructed content of the current picture (810).

A block with prediction mode of intra BC prediction can be a CB, PB or other block. When the block is a CB, the BV for the block can be signaled at CU level (and other CBs in the CU use the same BV or a scaled version thereof). Or, when the block is a PB, the BV for the block can be signaled at PU level (and other PBs in the PU use the same BV or a scaled version thereof). More generally, the BV for an intra-BC prediction block is signaled at an appropriate syntax level for the block.

The block copying operations of prediction according to the intra BC prediction mode can be performed at the level of CB (when a BV is signaled per CB) or PB (when a BV is signaled per PB). For example, suppose a 16×16 CB has a single 16×16 PB. The BV (for the PB) is applied to block copy a 16×16 region. When the intra-prediction region is constrained to not overlap the 16×16 block being predicted, the BV has a magnitude (absolute value) of at least 16 horizontally or vertically.

Alternatively, the block copying operations can be performed at the level of TBs within a PB or CB, even when the BV is signaled for the PB or CB. In this way, a BV, as applied for a TB, can reference positions of other TBs in the same PB or CB. For example, suppose a 16×16 CB has a single 16×16 PB but is split into sixteen 4×4 TBs for purposes of residual coding/decoding. The BV (for the PB) is applied to block copy a 4×4 region for the first TB in raster scan order, then the same BV is applied to block copy a 4×4 region for the second TB in raster scan order, and so on. The 4×4 region used in the BC operations for a TB can include positions in previously reconstructed TBs in the same CB, after combining residual values with predicted values for those previously reconstructed TBs. (A BV still does not reference positions in the same TB that is being predicted). Applying BC operations at the TB level facilitates use of BVs with relatively small magnitudes.

TB-level overlapping creates serial dependencies in reconstruction for the TUs within a PU, implicitly. This reduces opportunities for parallel computing and potentially decreases throughput at the hardware level. PU-level overlapping can eliminate such serial dependencies among TBs. In this case, block copying operations are performed at the level of PBs that can overlap. In this way, a BV, as applied for a PB, can reference positions of other PBs in the same CB. Suppose a 16×16 CB is split into two PBs for purposes of intra BC prediction (e.g., two 16×8 PBs, or two 8×16 PBs, or a 4×16 PB and 12×16 PB, etc.). The BV for one PB is applied to block copy a region for that PB, then the BV for the other PB is applied to block copy a region for the other PB. The region used in the BC operations for the second PB can include positions in the previously reconstructed first PB in the same CB, after combining residual values with predicted values for the first PB. (A BV still does not reference positions in the same PB that is being predicted). Applying BC operations at the PB level facilitates use of BVs with relatively small magnitudes (compared to applying BC operations at the CB level). Also, when BC operations are applied at the PB level, TU-level parallel processing is still allowed for the TBs within a PB.

Intra BC prediction operations for chroma blocks of a CU generally correspond to intra BC prediction operations for the luma block of the CU. Normally, the segmentation of chroma PBs and chroma TBs corresponds directly to the segmentation of the luma PBs and luma TBs in the CU. When the format of video is YUV 4:4:4, the sizes of chroma PBs and TBs match the sizes of corresponding luma PBs and TBs. When the format of video is YUV 4:2:0, chroma PBs and TBs are half the width and half the height of corresponding luma PBs and TBs. If a luma TB has minimum transform size, however, a single chroma TB having that minimum transform size is used. When the format of video is YUV 4:2:2, chroma PBs and TBs are half the width of corresponding luma PBs and TBs.

In some implementations, for an intra BC predicted CU, intra BC prediction for a chroma block in a PU uses the same BV value as intra BC prediction for the luma block in the PU, possibly after scaling and rounding when the chroma data has reduced resolution relative to the luma data (e.g. when the format is YUV 4:2:0 format, the BV value is divided by two for horizontal and vertical components; or, when the format is YUV 4:2:2 format, the BV value is divided by two for the horizontal component). Alternatively, different BV values can be signaled for the luma block and chroma blocks of a PU.

In some implementations, an encoder considers luma sample values when identifying a BV value or MV value during BV estimation or MV estimation. For example, the encoder attempts to match luma sample values for a current block (e.g., PB of a PU) to reconstructed luma sample values. The resulting BV value or MV value is also applied to chroma sample values of corresponding chroma blocks, however. Alternatively, an encoder considers luma sample values and corresponding chroma sample values when identifying a BV value or MV value during BV estimation or MV estimation.

In some implementations, if the prediction mode of the luma block of a PU is intra BC prediction, the prediction mode for the chroma blocks of the PU is also intra BC predicted. For example, the prediction mode is signaled for the PU. Alternatively, the prediction mode can be intra BC prediction for the luma block or chroma blocks of the PU, but not both.

B. Asymmetric Partitions.

FIG. 9 shows examples (900) of partitions of a block for intra BC prediction in some example implementations. A 2N×2N block is encoded using intra BC prediction. For example, the 2N×2N block is a 64×64 block, 32×32 block, 16×16 block or 8×8 block. The 2N×2N block can be intra-BC-predicted without partitioning. Or, the 2N×2N block can be partitioned in various ways, as shown in FIG. 9.

The 2N×2N block can be partitioned horizontally into two partitions. The two partitions can have the same dimensions—two 2N×N blocks—for symmetric partitioning. Or, the two partitions can be asymmetric. For example, the upper partition is a 2N×N/2 block, and the lower partition is a 2N×3N/2 block. Or, as another example, the upper partition is a 2N×3N/2 block, and the lower partition is a 2N×N/2 block. Thus, a 64×64 block can be partitioned into two 64×32 blocks, a 64×16 block and 64×48 block, or a 64×48 block and 64×16 block. A 32×32, 16×16 or 8×8 block can similarly be horizontally partitioned.

The 2N×2N block can instead be partitioned vertically into two partitions. The two partitions can have the same dimensions—two N×2N blocks—for symmetric partitioning. Or, the two partitions can be asymmetric. For example, the left partition is an N/2×2N block, and the right partition is a 3N/2×2N block. Or, as another example, the left partition is a 3N/2×2N block, and the right partition is an N/2×2N block. Thus, a 64×64 block can be partitioned into two 32×64 blocks, a 16×64 block and 48×64 block, or a 48×64 block and 16×64 block. A 32×32, 16×16 or 8×8 block can similarly be vertically partitioned.

Or, the 2N×2N block can be partitioned into four N×N partitions, which may be further sub-divided. For example, as shown in FIG. 9, a given N×N partition can be further partitioned into two N×N/2 blocks, two N/2×N blocks or four N/2×N/2 blocks. Thus, a 64×64 block can be partitioned into four 32×32 blocks, each of which may be further partitioned into two 32×16 blocks, two 16×32 blocks or four 16×16 blocks. A 32×32, 16×16 or 8×8 block can similarly be partitioned by quadtree splitting into four partitions.

As the term is used herein, an "N×1V" partition can also be considered a 2N×2N partition, in most cases. In H.265/ HEVC implementations, the term N×N is typically used to describe a PU or PB, but not a CU or CB. As used herein, the term "N×N partition" or "N×N block" indicates a partition of a 2N×2N current block (e.g., as part of top-down evaluation of partition modes or bottom-up evaluation of partition modes). In this context, the N×N partition or N×N block can itself be considered a 2N×2N block, and may be treated as such in further partitioning, unless the N×N partition or N×N block has the minimum size and is not further partitioned. Notation for partitions within an N×N partition or N×N block can similarly be adjusted.

Limiting asymmetric partition sizes to multiples of N/2 can reduce the complexity of evaluating which partition modes to use during encoding. Alternatively, an encoder can consider other partition sizes (e.g., multiples of N/4 or partition sizes m×n, more generally). Considering other partition sizes may slightly improve coding gains, but also increases the complexity of the search process during encoding, and may increase signaling overhead.

C. Example Techniques for Encoding or Decoding that Includes Intra BC Prediction with Asymmetric Partitions.

Figure 10:
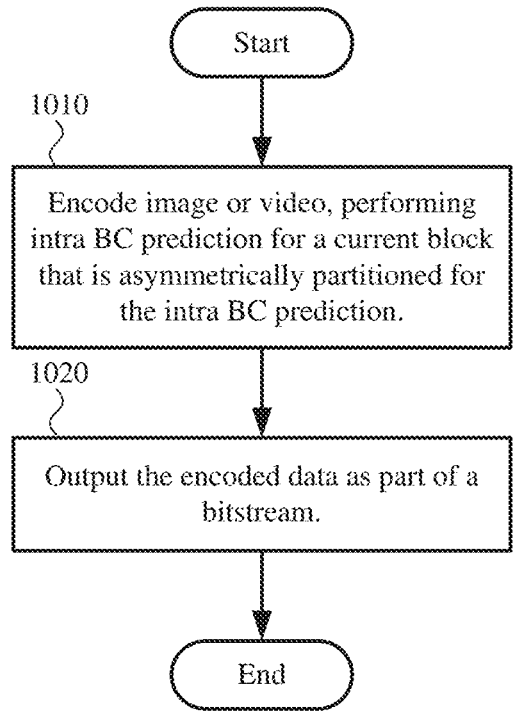
FIGS. 10 and 11 are generalized techniques for encoding and decoding, respectively, that include intra BC prediction with asymmetric partitions.
Figure 11:
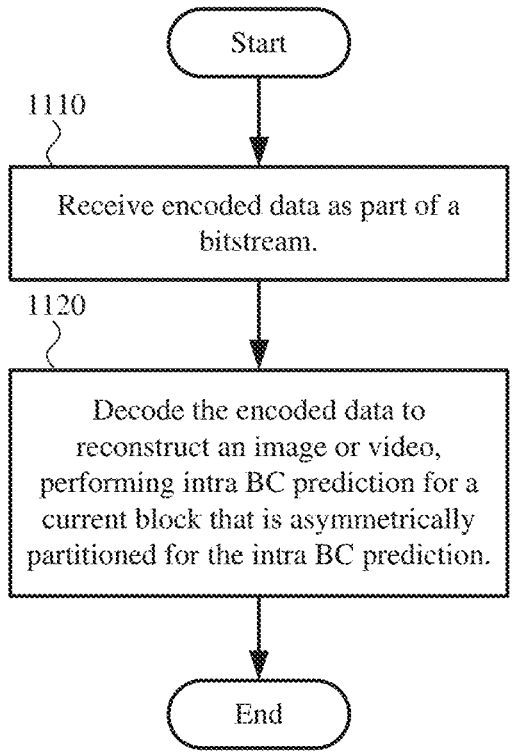

FIG. 10 shows a generalized technique (1000) for encoding that includes intra BC prediction with asymmetric partitions. An image encoder or video encoder such as described with reference to FIG. 3 or FIGS. 5a-5b can perform the technique (1000). FIG. 11 shows a generalized technique (1100) for decoding that includes intra BC prediction with asymmetric partitions. An image decoder or video decoder such as described with reference to FIG. 4 or FIG. 6 can perform the technique (1100).

With reference to FIG. 10, an encoder encodes (1010) an image or video to produce encoded data. As part of the encoding, the encoder performs intra BC prediction for a current block that is asymmetrically partitioned for the intra BC prediction. In particular, the current block can be split into two partitions that have different dimensions. The encoder outputs (1020) the encoded data as part of a bitstream.

With reference to FIG. 11, a decoder receives (1110) encoded data as part of a bitstream. The decoder decodes (1120) the encoded data to reconstruct an image or video. As part of the decoding, the decoder performs intra BC prediction for a current block that is asymmetrically partitioned for the intra BC prediction. In particular, the current block can be split into two partitions that have different dimensions.

For example, a current 2N×2N block is horizontally partitioned into (1) a 2N×N/2 block and 2N×3N/2 block or (2) a 2N×3N/2 block and 2N×N/2 block. Or, a current 2N×2N block is vertically partitioned into (1) an N/2×2N block and 3N/2×2N block or (2) a 3N/2×2N block and N/2×2N block. Alternatively, the current block is asymmetrically partitioned in some other way.

Another block can be symmetrically partitioned for the intra BC prediction. For example, the other block is a 2N×2N block that is partitioned into (1) two 2N×N blocks, (2) two N×2N blocks, or (3) four N×N blocks, each of which can be further partitioned into two N×N/2 blocks, two N/2×N blocks or four N/2×N/2 blocks. More generally, for symmetric partitioning, the other block can be split into partitions that have identical dimensions.

VIII. Encoder-Side Approaches to Partitioning

This section presents various encoder-side approaches to identifying partitions during motion estimation or block vector estimation (for intra BC prediction).

Examples of intra BC prediction and BV estimation are presented, for example, in sections V, VII.A, IX and X. BV estimation can be computationally complex, considering the large number of possible candidate blocks for a current block. The computational complexity of BV estimation is especially problematic when the search range for BV values encompasses all of the previously reconstructed areas of a picture, due to the large number of candidate blocks against which a current block is compared. For candidate blocks of an entire frame, the number of operations is even higher. When the encoder evaluates asymmetric partitions, the complexity of BV estimation is further increased.

The computational complexity of motion estimation can also be very high, as explained in the following section.

A. Motion Estimation and MV Values—Introduction.

For motion estimation, the sample values of a current block of a current picture are predicted using sample values in another picture, which is called the reference picture. A motion vector ("MV") value indicates a displacement from the position of the current block in the reference picture to a region of the reference picture (the "reference region") that includes the sample values used for prediction. The reference region provides predicted values for the current block. The sample values used for prediction are previously reconstructed sample values, which are thus available at the encoder during encoding and at the decoder during decoding. The MV value is signaled in the bitstream, and a decoder can use the MV value to determine the reference region of the reference picture to use for prediction, which is also reconstructed at the decoder. When multiple reference pictures are available, the bitstream can also include an indication of which of the reference picture to use to find the reference region.

FIG. 12 illustrates motion estimation for a current block (1230) of a current picture (1210). The current block can be a coding block ("CB") of a coding unit ("CU"), prediction block ("PB") of a prediction unit ("PU"), transform block ("TB") of a transform unit ("TU") or other block. The size of the current block can be 64×64, 32×32, 16×16, 8×8 or some other size. More generally, the size of the current block is m×n, where each of m and n is a whole number, and where m and n can be equal to each other or can have different values. Thus, the current block can be square or rectangular. Alternatively, the current block can have some other shape.

The MV value (1240) indicates a displacement (or offset) from the position of the current block (1230) to a reference region (sometimes called a reference block) in a reference picture (1250), which includes the sample values used for prediction. The reference region indicated by the MV value (1240) is sometimes termed the "matching block" for the current block (1230). The matching block can be identical to the current block (1230), or it can be an approximation of the current block (1230). Suppose the top-left position of the current (1230) block is at position ($x_0$, $y_0$) in the current picture (1210), and suppose the top-left position of the reference region is at position ($x_1$, $y_1$) in the reference picture (1250). The MV value (1240) indicates the displacement ($x_1-x_0$, $y_1-y_0$). For example, if the top-left position of the current block is at position (256, 128), and the top-left position of the reference region is at position (126, 104), the MV value is (−130, −24). In this example, a negative horizontal displacement indicates a position to the left of the current block, and a negative vertical displacement indicates a position above the current block.

The reference region for the current block (1230) is selected from among multiple candidate blocks during motion estimation. FIG. 12 also shows some of the candidate blocks for the current block (1230) of the current picture (1210) in motion estimation. Four MV values (1241, 1242, 1243, 1244) indicate displacements for four candidate blocks. In general, the candidate blocks can be anywhere within the reference picture (1250). A candidate block can overlap with other candidate blocks, as shown for the candidate blocks indicated by the MV values (1243, 1244). The computational complexity of motion estimation is especially problematic when the search range for MV values encompasses all of a reference picture, due to the large number of candidate blocks against which a current block is compared. This computational complexity is compounded when motion estimation is performed for multiple reference pictures.

B. Precision of BV Values and MV Values.

In many of the examples described herein, BV values have integer-sample precision. Such BV values indicate integer-sample offsets. Intra BC prediction is often used when encoding artificially-created video (such as screen content video), for which fractional-sample displacements are rare, so integer-sample precision is sufficient for BV values. Alternatively, BV values can indicate fractional-sample offsets. For example, a BV value with ½-sample precision can indicate a horizontal and/or vertical displacement with a ½-sample offset (such as 1.5 samples, 2.5 samples, and so on). Or, a BV value with ¼-sample precision can indicate a horizontal and/or vertical displacement with a ¼, ½ or ¾-sample offset. Or, a BV value with ⅛-sample precision can indicate a horizontal and/or vertical displacement with a ⅛, ¼, ⅜, ½, ⅝, ¾, or ⅞-sample offset. Or, a BV value can have some other precision.

On the other hand, MV values typically have fractional-sample precision, since fractional-sample displacements are common when encoding natural video. For example, MV values can have ½-sample precision, ¼-sample precision, ⅛-sample precision or some other precision. Alternatively, MV values have integer-sample precision.

C. Approaches to Identifying Partitions.

In general, an encoder can use a top-down approach or bottom-up approach when identifying partitions during motion estimation or BV estimation (for intra BC prediction). A bottom-up approach initially evaluates options for smallest-size partitions, then uses results from that initial evaluation when evaluating options for successively larger-size partitions. A bottom-up approach can be computationally expensive. On the other hand, a top-down approach initially evaluates options for larger-size partitions, then uses results from that initial evaluation when evaluating options for successively smaller-size partitions. A top-down approach is less likely to identify an optimal way to partition blocks, but is usually computationally simpler than a bottom-up approach.

For additional details about partitioning approaches, see, e.g.: (1) Sullivan et al., "Efficient Quadtree Coding of Images and Video", in *Proc. IEEE Int. Conf. on Acoust., Speech, and Signal Proc.* (ICASSP), Toronto, Canada, Vol. 4, pp. 2661-2664, May 1991, which describes how to identify an optimal tree in the rate-distortion sense for tree-structured coding (at least under some circumstances); (2) Sullivan et al., "Rate-Distortion Optimized Motion Compensation for Video Compression using Fixed or Variable Size Blocks", in *Proc. IEEE Global Telecom. Conf.* (GLOBECOM), Phoenix, Arizona, pp. 85-90, December 1991, which describes how to apply rate-distortion optimization to motion compensation (with or without trees); and (3) Sullivan et al., "Efficient Quadtree Coding of Images and Video", *IEEE Trans. on Image Proc.*, Vol. IP-3, No. 3, pp. 327-331, May 1994, which further describes how to identify an optimal tree in the rate-distortion sense for tree-structured coding.

In some implementations, applying one of the top-down approaches or bottom-up approaches described below, an encoder identifies partitions for a PU. The encoder can set the partitions for a PU based on analysis of luma PBs of the PU. Or, the encoder can set the partitions for a PU based on analysis of both luma PBs and chroma PBs of the PU. In any case, the partitions set on a PU basis are then applied to PBs of the PU. Alternatively, an encoder identifies partitions for another type of unit or block.

1. Top-down Approaches to Identifying Partitions.

Figure 13:
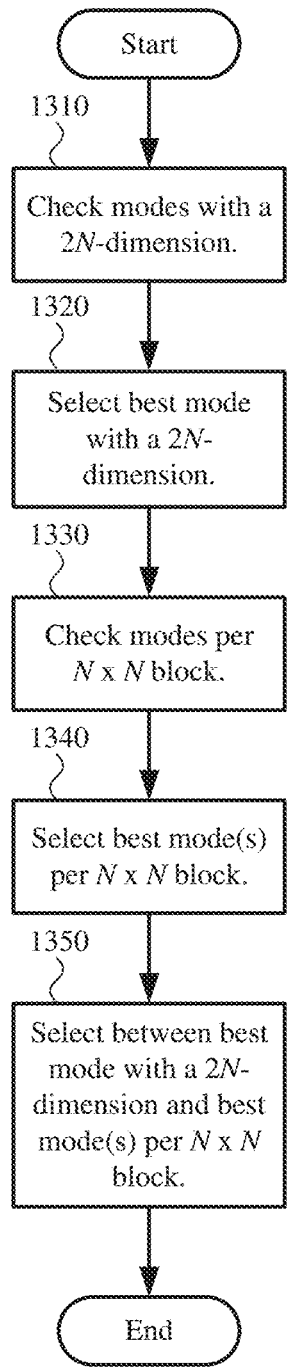
FIG. 13 is a flowchart and accompanying diagram illustrating a top-down approach to partitioning an intra-BC-predicted block.

An encoder can use a top-down approach when identifying partitions of a current block during BV estimation (for intra BC prediction) or motion estimation. The current block can be a PB of a PU, or other type of block. FIG. 13 is a flowchart and accompanying diagram illustrating a top-down approach to partitioning an intra-BC-predicted block. An image encoder or video encoder such as described with reference to FIG. 3 or FIGS. 5a-5b can use the approach (1300). In the example shown in FIG. 13, the encoder identifies at least some partitions of an intra-BC-predicted 2N×2N block with asymmetric partitioning.

The encoder checks (1310) modes with a 2N-dimension. For example, the encoder checks a mode for a single 2N×2N block, a mode for two 2N×N blocks, a mode for two N×2N blocks, modes for one N/2×2N block and one 3N/2×2N block (two options shown in FIG. 13, with narrow block at left or right) and modes for one 2N×N/2 block and one 2N×3N/2 block (two options shown in FIG. 13, with shorter block at top or bottom). For a 16×16 CU, for example, the encoder checks all of the PUs with size 16×P and all of the PUs with size P×16, where P can be 4, 8, 12 and 16, in the allowed combinations.

For a given mode for the current 2N×2N block, the encoder determines BV value(s) for block(s) of the current 2N×2N block according to the mode. For a block of the current 2N×2N block, the encoder can select a starting BV value, for example, based on (1) the BV value(s) used by neighboring block(s) in the current picture, (2) the BV value used by a collocated block of a previous picture, or (3) an MV value identified for the block of the current 2N×2N block in earlier motion estimation. The encoder then finds a suitable BV value for the block of the current 2N×2N block.

The encoder selects (1320) the best mode with a 2N-dimension. The selection criterion can be distortion cost, bit rate cost or some combination of distortion cost and bit rate cost, or the selection criterion can use some other metric (e.g., using a variance threshold or edge detector). For example, in FIG. 13, the encoder selects the mode with a left N/2×2N block and right 3N/2×2N block.

After splitting of the 2N×2N block as a quadtree, the encoder also checks (1330) modes per N×N block of the 2N×2N block. For example, for a given N×N block, the encoder checks a mode for a single N×N block, a mode for two N×N/2 blocks, a mode for two N/2×N blocks, and a mode for four N/2×N/2 blocks. The encoder can check each N×N block separately. For an 8×8 CU, for example, the encoder checks an 8×8 PU, two 8×4 PUs, two 4×8 PUs and four 4×4 PUs.

For a given mode for a given N×N block, the encoder determines BV value(s) for block(s) of the given N×N block according to the mode. The encoder can select starting BV values, for example, based on the BV values that were identified for the current 2N×2N block. The encoder then finds suitable BV value(s) for the block(s) of the given N×N block according to the mode.

The encoder selects (1340) the best combination of modes for the respective N×N blocks. The selection criterion can be distortion cost, bit rate cost or some combination of distortion cost and bit rate cost, or the selection criterion can use some other metric (e.g., using a variance threshold or edge detector). As shown in FIG. 13, different N×N blocks can have the same mode or different modes.

For the 2N×2N block, the encoder then selects (1350) between the best mode with a 2N-dimension and the combination of best modes for the respective N×N blocks. The selection criterion can be distortion cost, bit rate cost or some combination of distortion cost and bit rate cost, or the selection criterion can use some other metric (e.g., using a variance threshold or edge detector).

2. Bottom-up Approaches to Identifying Partitions

Figure 14:
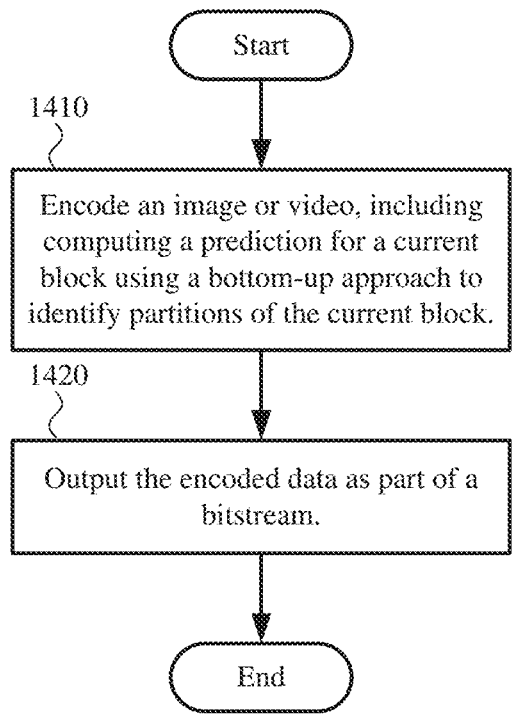
FIG. 14 is a flowchart illustrating a generalized technique for using a bottom-up approach to partitioning.

Instead of using a top-down approach, an encoder can use a bottom-up approach when identifying partitions of a current block during BV estimation (for intra BC prediction) or motion estimation. FIG. 14 is a flowchart illustrating a generalized technique for using a bottom-up approach to partitioning. An image encoder or video encoder such as described with reference to FIG. 3 or FIGS. 5a-5b can perform the technique (1400).

The encoder encodes (1410) an image or video to produce encoded data. As part of the encoding (e.g., as part of motion estimation or as part of block vector estimation for intra BC prediction), the encoder computes a prediction for a current block of a current picture. The current block can be a PB of a PU, or other type of block. When computing the prediction, the encoder uses a bottom-up approach to identify partitions of the current block. The encoder can asymmetrically partition the current block, such that the partitions of the current block are two partitions that have different dimensions, or symmetrically partition the current block, such that the partitions of the current block have identical dimensions.

In general, for the bottom-up approach, for a current block, the encoder checks at least some partition modes for smaller blocks within the current block. The encoder caches results such as BV values or MV values for the smaller blocks. The encoder then checks at least some partition modes for the current block, using the cached results (from the smaller blocks) to reduce the computational complexity of checking the partition modes for the current block. For example, the encoder uses the cached results from the smaller blocks to identify starting BV values (during BV estimation) or MV values (during motion estimation) for the partition modes for the current block. In many cases, the starting BV values (or MV values) will be used for the current block, which significantly shortens the search process. FIGS. 15 and 16 show example bottom-up approaches to identifying partitions for a current block. Alternatively, the encoder uses another bottom-up approach.

The encoder then outputs (1420) the encoded data as part of a bitstream.

FIG. 15 is a flowchart and accompanying diagram illustrating a bottom-up approach (1500) to partitioning an intra-BC-predicted block. An image encoder or video encoder such as described with reference to FIG. 3 or FIGS. 5a-5b can use the approach (1500).

For a 2N×2N block that is split as a quadtree, the encoder checks (1510) modes per N×N block of the 2N×2N block. For example, for a given N×N block, the encoder checks a mode for a single N×N block, a mode for two N×N/2 blocks, a mode for two N/2×N blocks, and a mode for four N/2×N/2 blocks. The encoder can check each N×N block separately. For an 8×8 CU, for example, the encoder checks modes for an 8×8 PU, two 8×4 PUs, two 4×8 PUs and four 4×4 PUs.

For a given mode of a given N×N block, the encoder determines BV value(s) for block(s) of the given N×N block according to the mode. For a block of the given N×N block, the encoder can select a starting BV value, for example, based on (1) the BV value(s) used by neighboring block(s) in the current picture, (2) the BV value used by a collocated block of a previous picture, or (3) an MV value identified for the block of the given N×N block in earlier motion estimation. The encoder then finds a suitable BV value for the block of the given N×N block.

The encoder selects (1520) the best combination of modes for the respective N×N blocks. The selection criterion can be distortion cost, bit rate cost or some combination of distortion cost and bit rate cost, or the selection criterion can use some other metric (e.g., using a variance threshold or edge detector). As shown in FIG. 15, different N×N blocks can have the same mode or different modes.

The encoder caches (1530) vector values, partition mode information and/or other results of the checking (1510) modes per N×N block of the 2N×2N block. For example, the encoder caches BV values during BV estimation, as well as partition mode selections for the N×N blocks of the 2N×2N block.

The encoder checks (1540) modes with a 2N-dimension, using the cached information to reduce computational complexity by shortening the search process in many cases. The encoder can use the cached results to identify starting BV values (during BV estimation) for the 2N×2N block. In many cases, the starting BV values will be used for the 2N-dimension partition modes of the 2N×2N block, which significantly shortens the search process.

For example, the encoder checks a mode for a single 2N×2N block, a mode for two 2N×N blocks, a mode for two N×2N blocks, modes for one N/2×2N block and one 3N/2×2N block (two options shown in FIG. 15, with narrow block at left or right), and modes for one 2N×N/2 block and one 2N×3N/2 block (two options shown in FIG. 15, with shorter block at top or bottom). For a 16×16 CU, for example, the encoder reuses information cached after checking partition modes for the four 8×8 CUs of the 16×16 CU. In many cases, a partition mode for the 16×16 CU ends up using a cached BV value from an 8×8 CU, which significantly shortens the search process.

The encoder selects (1550) the best mode with a 2N-dimension. The selection criterion can be distortion cost, bit rate cost or some combination of distortion cost and bit rate cost, or the selection criterion can use some other metric (e.g., using a variance threshold or edge detector). For example, in FIG. 15 the encoder selects the mode with a left N/2×2N block and right 3N/2×2N block.

For the 2N×2N block, the encoder then selects (1560) between the best mode with a 2N-dimension and the combination of modes for the respective N×N blocks. The selection criterion can be distortion cost, bit rate cost or some combination of distortion cost and bit rate cost, or the selection criterion can use some other metric (e.g., using a variance threshold or edge detector).

The technique (1500) described with reference to FIG. 15 can also be used for bottom-up partitioning of inter-coded blocks. In this case, MV values and other results from N×N blocks are cached. An encoder can use the cached results to identify starting MV values (during motion estimation) for the 2N×2N block. In many cases, the starting MV values will be used for the 2N-dimension partition modes of the 2N×2N block, which significantly shortens the search process.

FIG. 16 is a flowchart and accompanying diagram illustrating even faster bottom-up approaches (1600) to partitioning an intra-BC-predicted block. An image encoder or video encoder such as described with reference to FIG. 3 or FIGS. 5a-5b can use one of the approaches (1600). The approaches (1600) in FIG. 16 are similar to the approach (1500) in FIG. 15, but have been modified in several places to further shorten the search process.

For a 2N×2N block that is split as a quadtree, the encoder checks (1610) a subset of modes per N×N block of the 2N×2N block. That is, the encoder checks some but not all of the modes per N×N block. For example, for a given N×N block, the encoder checks only a mode with two N×N/2 blocks. Or, as another example, the encoder checks only a mode with two N/2×N blocks. The encoder can check each N×N block separately. By checking fewer modes, however, the search process is shortened. Alternatively, the encoder checks other and/or additional modes per N×N block.

If multiple modes were checked (1610), the encoder selects (1620) the best combination of modes for the respective N×N blocks. The selection criterion can be distortion cost, bit rate cost or some combination of distortion cost and bit rate cost, or the selection criterion can use some other metric (e.g., using a variance threshold or edge detector). If only a single mode was checked (1610), the encoder simply uses that mode per N×N block.

The encoder caches (1630) vector values, partition mode information and/or other results of the checking (1610) modes per N×N block of the 2N×2N block. For example, the encoder caches BV values during BV estimation, as well as partition mode selections for the N×N blocks of the 2N×2N block.

The encoder checks (1640) a subset of modes with a 2N-dimension, using the cached information to reduce computational complexity. For example, if the encoder checked (1610) only N×N/2 blocks of the N×N blocks, the encoder checks a mode for a single 2N×2N block, a mode for two 2N×N blocks, and modes for one 2N×N/2 block and one 2N×3N/2 block (two options shown in FIG. 16, with shorter block at top or bottom). Or, if the encoder checked (1610) only N/2×N blocks of the N×N blocks, the encoder checks a mode for a single 2N×2N block, a mode for two N×2N blocks, and modes for one N/2×2N block and one 3N/2×2N block (two options shown in FIG. 16, with narrow block at left or right).

Or, as another example (not illustrated in FIG. 16), the encoder checks (1610) only the N×N partition per N×N block of the 2N×2N block. If the 2N×2N block is an intra-coded block, the encoder checks (1640) a mode for a single 2N×2N block, a mode for two N×2N blocks, and modes for one N/2×2N block and one 3N/2×2N block (with narrow block at left or right). If the 2N×2N block is an inter-coded block, the encoder checks (1640) a mode for a single 2N×2N block, a mode for two 2N×N blocks, and modes for one 2N×N/2 block and one 2N×3N/2 block (with shorter block at top or bottom).

The encoder selects (1650) the best mode with a 2N-dimension. The selection criterion can be distortion cost, bit rate cost or some combination of distortion cost and bit rate cost, or the selection criterion can use some other metric (e.g., using a variance threshold or edge detector). For the 2N×2N block, the encoder then selects (1660) between the best mode with a 2N-dimension and the combination of modes for the respective N×N blocks. The selection criterion can be distortion cost, bit rate cost or some combination of distortion cost and bit rate cost, or the selection criterion can use some other metric (e.g., using a variance threshold or edge detector).

The technique (1600) described with reference to FIG. 16 can also be used for bottom-up partitioning of inter-coded blocks. In this case, MV values and other results from N×N blocks are cached. An encoder can use the cached results to identify starting MV values (during motion estimation) for the 2N×2N block. In many cases, the starting MV values will be used for the 2N-dimension partition modes of the 2N×2N block, which significantly shortens the search process.

In the approaches (1500, 1600) shown in FIGS. 15 and 16, the encoder can limit the number of cached BV values or MV values. For example, the encoder stores only the BV value(s) or MV value(s) for the best partition mode per N×N block of a 2N×2N block. Alternatively, the encoder stores other BV values or MV values as well. An encoder constraint can control how many BV values or MV values the encoder stores.

IX. Search Patterns

This section presents various search patterns that can be used in motion estimation or intra BC prediction. In particular, the search patterns exploit common types of motion in screen capture video or other artificially-created video. In such video, the motion for a block is often pure horizontal motion or pure vertical motion (e.g., from scrolling of Web page content or application content in a computer desktop environment, or from scrolling of a ticker graphic in mixed content video). In this sense, the search patterns are adapted for screen capture video or other artificially-created video, but they can also be used when encoding natural video.

FIG. 17 is a flowchart illustrating a generalized technique (1700) for searching for a BV value or MV value for a block using iterative evaluation of a location in small neighborhood(s) and iterative confirmation of the location in larger neighborhood(s). An image encoder or video encoder such as described with reference to FIG. 3 or FIGS. 5a-5b can perform the technique (1700).

The encoder encodes an image or video to produce encoded data, and outputs the encoded data as part of a bitstream. During the encoding, the encoder computes a prediction for a current block of a current picture (e.g., using BV estimation or motion estimation). When computing the prediction, the encoder identifies (1710) a current best location for the prediction through iterative evaluation in a small neighborhood around the current best location for the prediction. For example, the small neighborhood includes locations that are immediately adjacent horizontally or vertically to the current best location. If one of the locations in the small neighborhood provides better results than the current best location, the current best location is replaced with the better location in the small neighborhood, and the new location is checked in a small neighborhood around it. In this way, the search process using the small neighborhood pattern can iteratively repeat, until the current best location is the best location in the small neighborhood around it. This might happen in the first iteration or after multiple iterations.

Figure 18A:
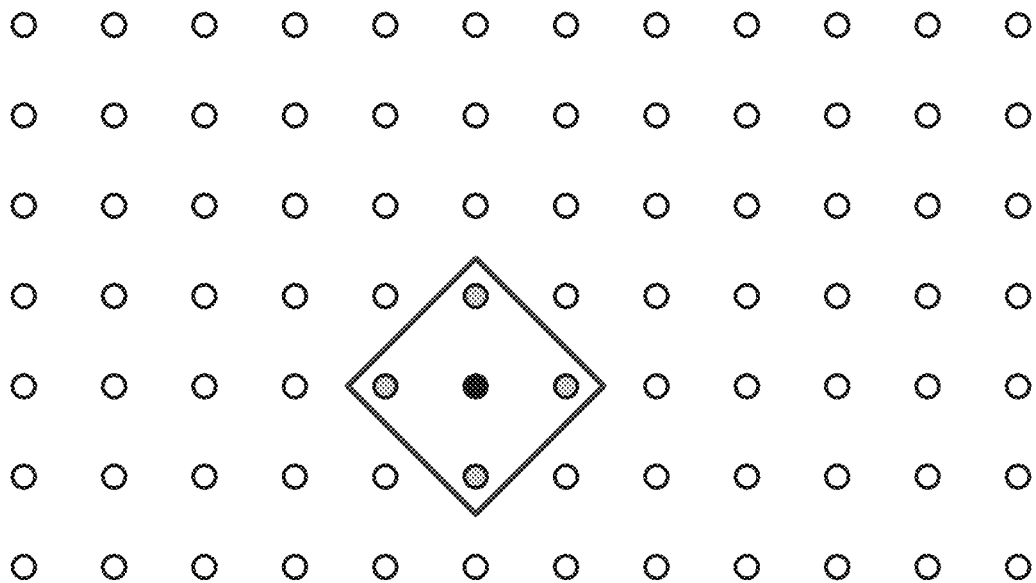
FIGS. 18a and 18b are diagrams illustrating iterative evaluation of a location in a small neighborhood, when searching for a BV value or MV value for a block.
Figure 18B:
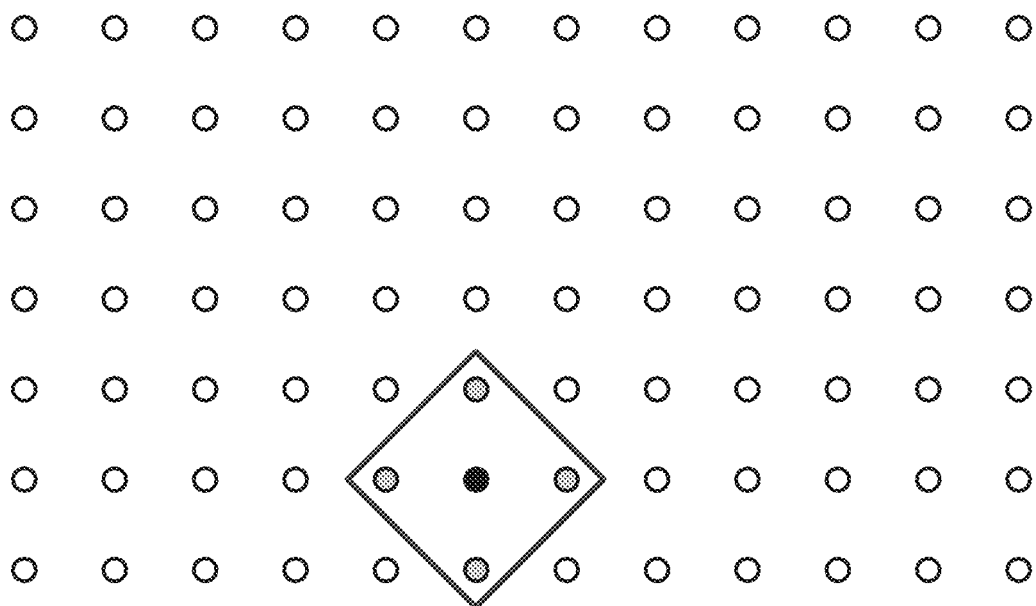

FIGS. 18a and 18b illustrate iterative evaluation of a location in a small neighborhood, when searching for a BV value or MV value for a block. In FIG. 18a, the current best location is shown as a black circle. Adjacent locations in a diamond pattern (shown as gray circles) are evaluated. Results for the four adjacent locations, respectively, are compared to results for the current best location (in terms of distortion cost, bit rate cost or some combination of distortion cost and bit rate cost). In the example of FIGS. 18a and 18b, the location below the current best location in FIG. 18a provides better results and becomes the current best location. In a next iteration, as shown in FIG. 18b, the adjacent locations in a diamond pattern around the new current best location are evaluated. Alternatively, the small neighborhood can have another shape.

The encoder can use a threshold to limit the number of iterations in the identification (1710) stage. The threshold depends on implementation and is, for example, 4 iterations. If a threshold number of iterations is reached, the encoder can perform another search process (e.g., a full search process or a hashing process) to determine the best location for the prediction.

Returning to FIG. 17, after identifying the current best location in the small neighborhood (within the threshold number of iterations), the encoder confirms (1720) the current best location for the prediction through iterative evaluation in successively larger neighborhoods around the current best location for the prediction. For example, each of the larger neighborhoods includes locations in a ring outside the small neighborhood. The successively larger neighborhoods can grow incrementally by one sample, two samples, etc. at each side. Or, the successively larger neighborhoods can be scaled up by some factor. For example, the radius of the larger neighborhood is scaled by a factor of 2 in each iteration after the first.

If one of the locations in a larger neighborhood provides better results than the current best location, the current best location is replaced with the better location in the larger neighborhood, and the encoder restarts the process at the new current best location. Otherwise (none of the locations in a larger neighborhood provides better results than the current best location), the encoder repeats the confirmation process with the next larger neighborhood, until a threshold number of iterations of the confirmation (1720) process is reached. The threshold depends on implementation and is, for example, any of 4 to 7 stages of checks for successively larger neighborhoods.

After the largest neighborhood is checked successfully, the encoder terminates the search process. Otherwise (shown as decision 1730), the encoder restarts the process at the new current best location.

FIG. 19 illustrates iterative confirmation of a location in one or more larger neighborhoods, when searching for a BV value or MV value for a block. In FIG. 19, the current best location is shown as a black circle. The encoder checks the eight locations at the corners and midpoints of a square (inner square) around the current best location. The eight locations are shown as gray circles in FIG. 19. Results for the eight locations, respectively, are compared to results for the current best location (in terms of distortion cost, bit rate cost or some combination of distortion cost and bit rate cost). If none of the eight locations in the inner square is better than the current best location, the encoder checks the eight locations (corners and midpoints) of a larger square (outer square in FIG. 19). Alternatively, the larger neighborhood can have another shape (e.g., circle of locations), include fewer locations that are evaluated (e.g., just corners) or include more locations that are evaluated (e.g., locations at perimeter of shape).

A counter for the first threshold (small neighborhood iterations) can be reset every time the identification (1710) stage is started or restarted. Or, the encoder can reset the counter for the first threshold only once, at the beginning of the process (1700). Similarly, the counter for the second threshold (large neighborhood iterations) can be reset every time the confirmation (1720) stage is started or restarted. Or, the encoder can reset the counter for the second threshold only once, at the beginning of the process (1700). If the counters are reset within the process (1700), the encoder can use another constrain to limit how long the search process continues, ensuring that it terminates within a reasonable amount of time.

Figure 20:
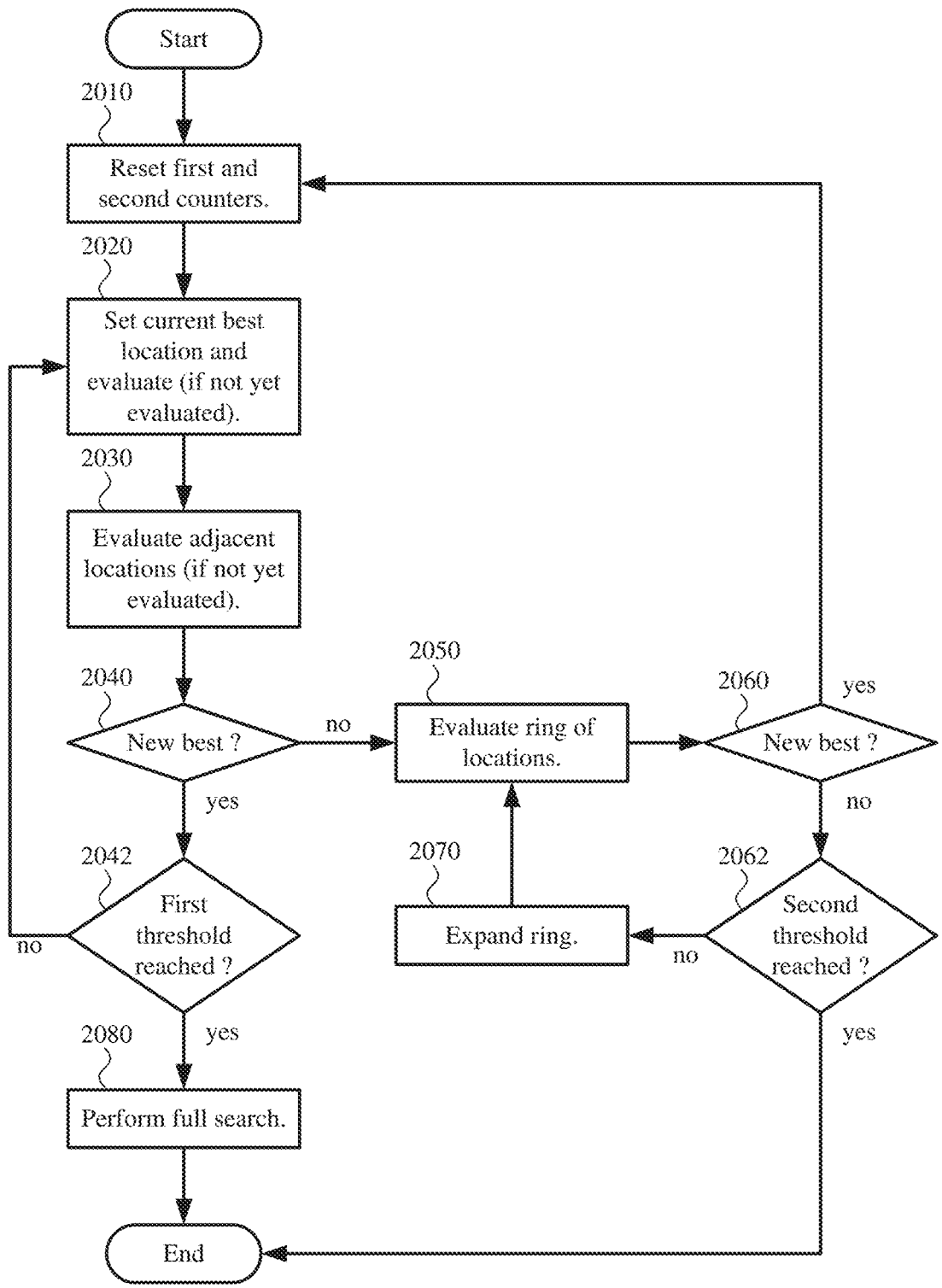
FIG. 20 is a flowchart illustrating an example technique for searching for a BV value or MV value for a block using iterative evaluation of a location in small neighborhood(s) and iterative confirmation of the location in larger neighborhood(s).

FIG. 20 is a flowchart illustrating an example technique for searching for a BV value or MV value for a block using iterative evaluation of a location in small neighborhood(s) and iterative confirmation of the location in larger neighborhood(s).

The encoder resets (2010) first and second counters. The encoder sets (2020) the current best location and evaluates it (if results for the current best location are not already available from previous evaluation). The encoder then evaluates (2030) adjacent locations in a small neighborhood around the current best location (if results for the adjacent locations are not already available from previous evaluation). The encoder checks (2040) if a new best location is found (by comparing results). If so, the encoder checks (2042) if a first threshold is reached using the first counter. If not, the encoder increments the first counter (not shown), sets (2010) the current best location to be the new best location (from among the adjacent locations) and continues from there. In this way, the encoder can iteratively check a small neighborhood of adjacent locations around a current best location.

If the first threshold is reached, the encoder performs (2080) a full search. Alternatively, the encoder uses another search process such as a hashing process.

If a new best location is not found (at decision (2040)), the encoder evaluates (2050) a ring of locations around the current best location. The encoder checks (2060) if a new best location is found (by comparing results). If so, the encoder resets (2090) the first and second counters, sets (2010) the current best location to be the new best location (from among the adjacent locations), and continues from there. In this way, the encoder restarts the process (2000)

Otherwise (new best location not found at decision (2060)), the encoder checks (2062) if a second threshold is reached using the second counter. If so, the encoder (successfully) terminates the search process. If not, the encoder increments the second counter (not shown), expands the ring (2070) of locations and evaluates (2050) the (expanded) ring of locations around the current best location.

In the examples described in this section, BV values and MV values indicate integer-sample offsets. Alternatively, BV values and/or MV values can indicate fractional-sample offsets. When fractional-sample offsets are permitted, the encoder can identify a BV value or MV value having an integer-sample offset as described with reference to FIGS. 17-20. Then, the encoder can identify a BV value or MV value in a neighborhood around the integer-sample BV or MV value (e.g., within a single-sample offset from the integer-sample BV or MV value).

Alternatively, when fractional-sample offsets are permitted, the encoder can identify a BV value or MV value having a fractional-sample offset with the permitted precision at each of the stages described with reference to FIGS. 17-20 (that is, identify a BV value or MV value having a fractional-sample offset in a small neighborhood, identify a BV value or MV value having a fractional-sample offset in a larger neighborhood, and so on).

X. Constraining by Search Range for Intra BC Prediction

In some example implementations, an encoder uses a full search range for BV estimation. The entire area of reconstructed sample value is searched to identify a BV value for a current block. While using a full search range can help identify the best BV values to use in intra BC prediction, it can also add to the complexity of BV estimation.

In other example implementations, an encoder limits BV search range according to one or more constraints. By limiting BV search range, the area of reconstructed sample values that is referenced by fast memory access for intra BC prediction during encoding and decoding can be reduced, which tends to lower implementation cost.

In the examples in this section, the encoder considers luma samples values of a current luma block when identifying a BV value during BV estimation. The encoder attempts to match luma sample values for the current block to reconstructed luma sample values of previous luma blocks. The resulting BV value is also applied to chroma sample values of corresponding chroma blocks, however.

Figure 21A:
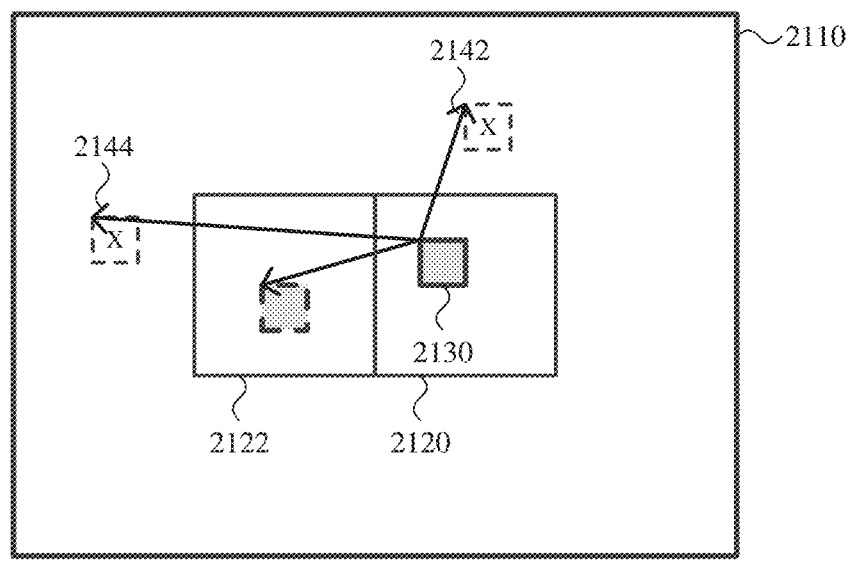
FIGS. 21*a*-21*e* are diagrams illustrating example constraints on search range for BV values.

FIG. 21*a* illustrates example constraints on search range for BV values. In addition to a current block (2130) of a current frame (2110), FIG. 21*a* shows a search range defined by two CTBs (2120, 2122). The current CTB (2120) is part of the current CTU and includes the current block (2130). With the CTB (2122) to its left, the current CTB (2120) defines a search range within which allowable BVs can be found for the current block (2130). BVs (2142, 2144) reference regions that are outside the search range, so those BV values (2142, 2144) are not allowed.

In some example implementations, the search range for BV values for a current block is the current CTB and the CTB to its left. For example, a CTB can have size of 64×64, 32×32 or 16×16 sample values, which yields a search range of 128×64, 64×32 or 32×16 sample values. Only sample value in the current CTB and left CTB are used for intra BC prediction for the current block. This simplifies encoder implementation by constraining the search process. It also simplifies decoder implementation by limiting the number of sample values that the decoder buffers in fast memory for intra prediction. (The decoder has adequate buffer capacity to store sample values for two CTBs of the largest possible dimensions, even if a smaller CTU/CTB size is selected.) Another constraint is that intra prediction cannot reference sample values from another slice or tile. For a current m×n block with a top left position at $(x_0, y_0)$ and CTB(s) each having dimensions $CTB_{sizeY} \times CTB_{sizeY}$, an encoder can check these constraints for a two-dimensional BV having a horizontal component BV[0] and vertical component BV[1] as follows.

$$BV[0] \geq -((x_0 \% \ CTB_{sizeY}) + CTB_{sizeY})$$

$$BV[1] \geq -(1\% \ CTB_{sizeY})$$

The sample values at positions $(x_0, y_0)$, $(x_0+BV[0], y_0+BV[1])$ and $(x_0+BV[0]+m-1, y_0+BV[1]+n-1)$ shall be in the same slice.

The sample values at positions $(x_0, y_0)$, $(x_0+BV[0], y_0+BV[1])$ and $(x_0+BV[0]+m-1, y_0+BV[1]+n-1)$ shall be in the same tile.

In practice, evaluating candidate BV values in a large, square search range (such as an S×S search range, where S is $CTB_{sizeY}$) or large, rectangular search range (such as a 2S×S search range, where S is $CTB_{sizeY}$) does not make sense if the best BV values tend to be either horizontally oriented or vertically oriented. Instead, the encoder can use a smaller search range that still includes likely candidate BV values, where the smaller BV search range is horizontally oriented (e.g., with dimensions 2S×¼S or 2S×¾S) or vertically oriented (e.g., with dimensions ¼S×2S or ¾S×2S).

In most scenarios, the encoder checks fewer BV values during BV estimation, but still finds the most suitable BV values.

A BV search range with horizontal bias (or horizontal orientation) includes candidate BV values with a wider range of horizontal BV component values than vertical BV component values. Conversely, a BV search range with vertical bias (or vertical orientation) includes candidate BV values with a wider range of vertical BV component values than horizontal BV component values.

The BV search range can also be subject to other constraints. For example, the BV search range can be subject to the constraint that any BV value for the current block reference a region that lies within the current CTB and/or CTB to the left of the current CTB. That is, the BV search range fits within the current CTB and CTB to its left. Or, as another example, the BV search range can be subject to the constraint that any BV value for the current block reference a region that lies within the current CTB and/or CTB above the current CTB. That is, the BV search range fits within the current CTB and CTB above it. The BV search range can also be constrained to fit within the current picture. In some implementations, the BV search range is further constrained to fit within the current slice and/or current tile.

Aside from a constraint at the far boundary of a BV search range (away from the current block), the BV search range can be constrained at its near boundary (close to the current block). For example, in some implementations, for a CU having size 2N×2N, a PU partition can have size N×N and 2N×N or N×2N, where each PU has its own BV, or some other partition size. The BV of a PU is not allowed to reference other PU regions within the same CU, however. This constraint on BV search range somewhat reduces performance relative to allowing PU-level overlap, but allows each PU to have its own BV and allows the PUs within each CU to be reconstructed in parallel, which may facilitate efficient decoding.

Alternatively, if overlap between a CB and corresponding intra-prediction region is allowed, the encoder can perform overlap processing. In this case, the BV search range with horizontal bias or vertical bias can extend into the current CU.

Figure 21B:
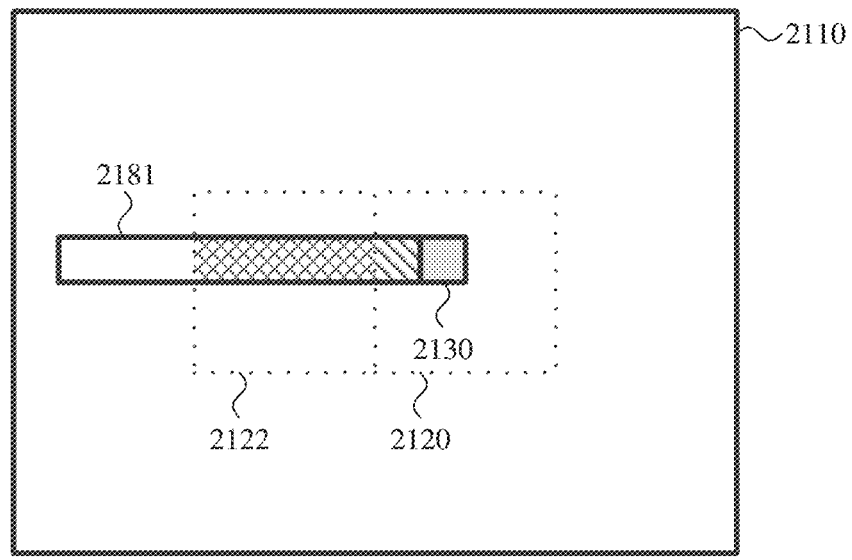

FIG. 21b shows a first alternative search range (2181) that has a horizontal bias (horizontal orientation). The search range (2181) has dimensions of up to 2S×¼S. The search range (2181) may be truncated to fit within the current CTB and CTB to its left, as shown in the cross-hatched and hatched portions of the search range (2181). Or, the search range (2181) may be further constrained to not include any portion in the current CTB (shown as the hatched portion of the search range (2181) in FIG. 21b).

Figure 21C:
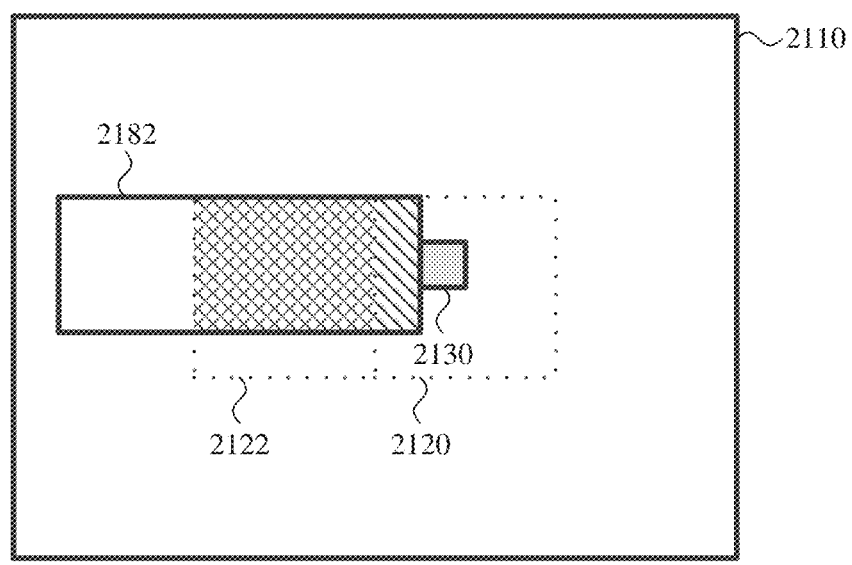

FIG. 21c shows a second alternative search range (2182) that has a horizontal bias. The search range (2182) has dimensions of up to 2S×¾S. The search range (2182) may be truncated to fit within the current CTB and CTB to its left, as shown in the cross-hatched and hatched portions of the search range (2182). Or, the search range (2182) may be further constrained to not include any portion in the current CTB (shown as the hatched portion of the search range (2182) in FIG. 21c).

Figure 21D:
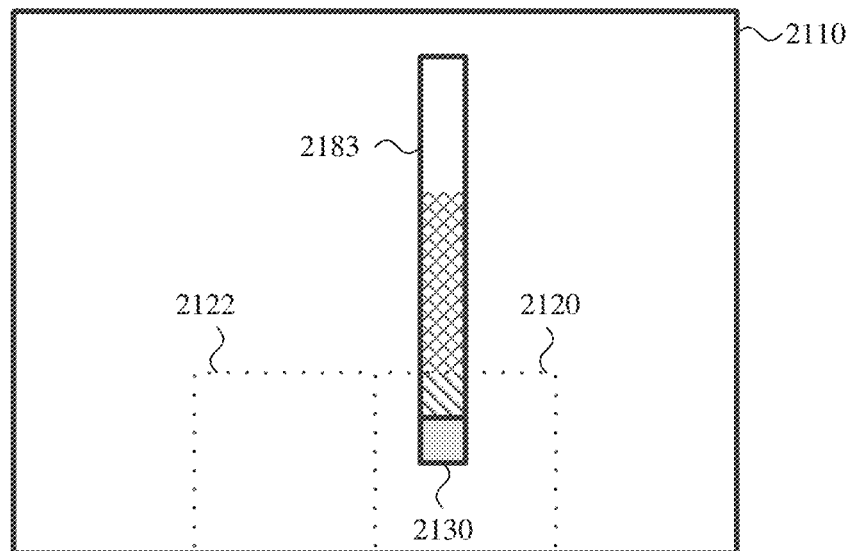

FIG. 21d shows a third alternative search range (2183) that has a vertical bias (vertical orientation). The search range (2183) has dimensions of up to ¼S×¾S. The search range (2183) may be truncated to fit within the current CTB and CTB above it, as shown in the cross-hatched and hatched portions of the search range (2183). Or, the search range (2183) may be further constrained to not include any portion in the current CTB (shown as the hatched portion of the search range (2183) in FIG. 21d).

Figure 21E:
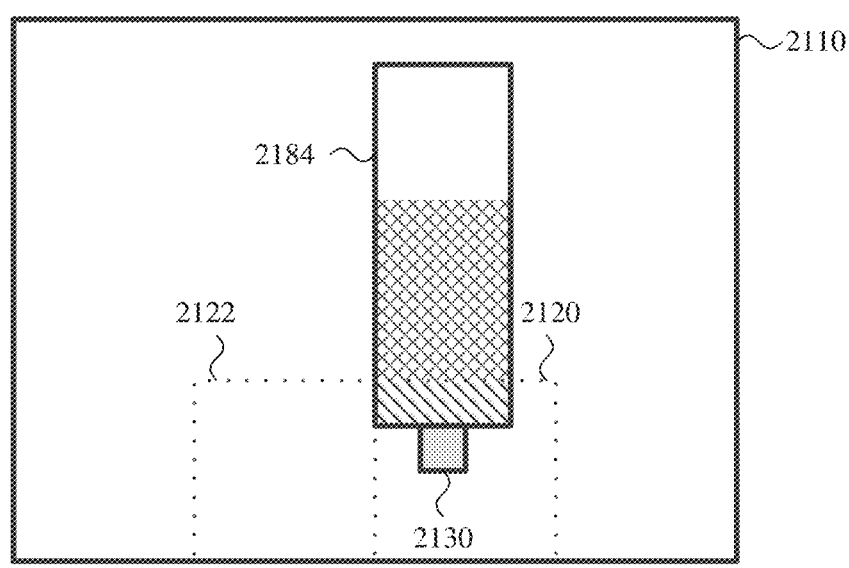

FIG. 21e shows a fourth alternative search range (2184) that has a vertical bias. The search range (2184) has dimensions of up to ¾S×2S. The search range (2184) may be truncated to fit within the current CTB and CTB above it, as shown in the cross-hatched and hatched portions of the search range (2184). Or, the search range (2184) may be further constrained to not include any portion in the current CTB (shown as the hatched portion of the search range (2184) in FIG. 21d).

During BV estimation, a video encoder or image encoder can perform encoding that includes BV estimation as follows.

The encoder determines a BV for a current block of a picture. The BV indicates a displacement to a region within the picture. The current block is in a current CTB having size S. As part of determining the BV, the encoder checks a constraint that the region is within a BV search range having a horizontal bias or vertical bias. The encoder performs intra BC prediction for the current block using the BV. The encoder also encodes the BV. For example, the encoder performs the BC prediction and encodes the BV as described elsewhere in this application.

More generally, the encoder encodes data for a picture using intra BC prediction. The encoding includes performing BV estimation operations using a BV search range with a horizontal or vertical bias. The encoder outputs the encoded data for the picture.

The BV search range can have a horizontal bias, having dimensions 2S×¼S or 2S×¾S. Or, more generally, the horizontally-biased BV search range has a width between S and 2S, inclusive, and has a height between ¼S and ¾S, inclusive. Or, the BV search range can have a vertical bias, having dimensions ¼S×2S or ¾S×2S. Or, more generally, the vertically-biased BV search range has a height between S and 2S, inclusive, and has a width between ¼S and ¾S, inclusive.

The encoder can select the BV search range from among multiple available BV search ranges. For example, the encoder selects among multiple search ranges having horizontal bias (such as 2S×¼S and 2S×¾S search ranges). Or, the encoder selects among multiple search ranges having vertical bias (such as ¼S×2S and ¾S×2S search ranges). Or, the encoder selects among multiple search ranges each having either horizontal bias or vertical bias.

The encoder can select the BV search range based at least in part on BV values of one or more previous blocks. For example, the previous block(s) are in the current picture. Or, the previous block(s) are in one or more previous pictures. Or, the previous blocks are in the current picture and in one or more previous pictures. By considering the BV value(s) of previous block(s), the encoder can identify trends in BV values (e.g., that most BV values have a strong horizontal BV component but little or no vertical BV component) and select an appropriate BV search range. The selection of the BV search range can also depend on other factors (e.g., a user setting).

The BV value(s) for the previous block(s) can be tracked, for example, using a data structure that organizes the BV value(s) as a histogram, with different categories (or "bins") corresponding to different ranges of BV values and storing a count per category/bin. Thus, the histogram data structure can provide statistics about the frequency of use of different BV values. Or, the BV value(s) can be tracked in some other way. For example, the encoder tracks BV values for blocks of a current picture, then evaluates the BV values of previous blocks in a neighborhood around the current block to determine which BV search range to use.

Using a smaller BV search range with horizontal or vertical bias may be slightly less efficient (in terms of rate-distortion performance) than using a larger, S×S or 2S×S search range. For many encoding scenarios, the reduction in computational complexity of BV estimation justifies this penalty.

Figure 22:
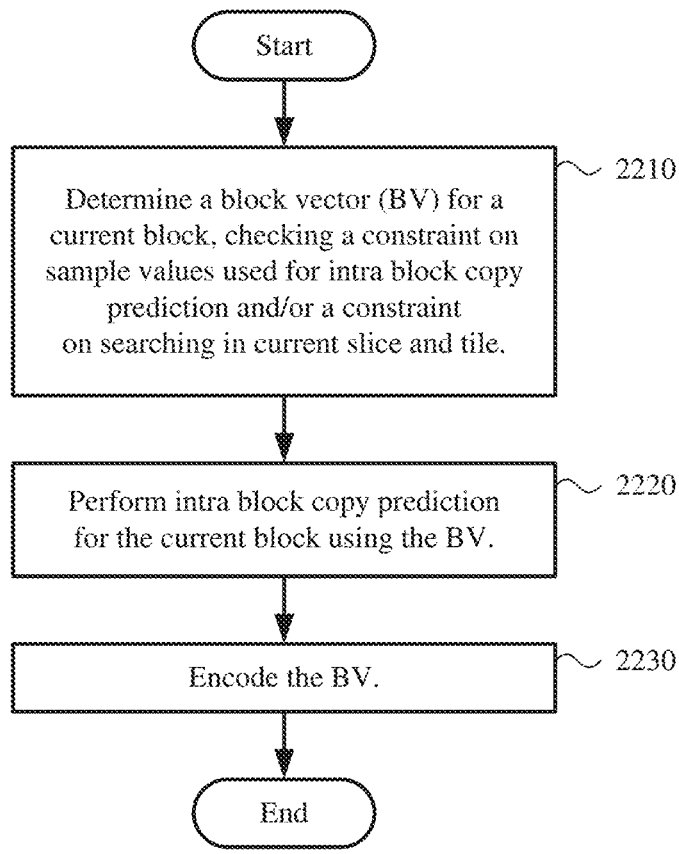
FIG. 22 is a flowchart illustrating a generalized technique for encoding with an intra BC prediction mode, subject to one or more constraints on selection of BV values.

FIG. 22 shows a technique (2200) for encoding with an intra BC prediction mode, subject to one or more constraints on selection of BV values. An encoder such as one described with reference to FIG. 3 or FIGS. 5a-5b can perform the technique (2200).

To start, the encoder determines (2210) a BV for a current block of a picture. The current block can be a CB, PB or other block. The BV indicates a displacement to a region within the picture. In determining the BV, the encoder checks one or more constraints.

According to one possible constraint, the encoder checks range of sample values used for intra BC prediction. The encoder can check that a candidate intra-prediction region is within a range defined by a current CTB and one or more other CTBs (e.g., CTB to the left of the current CTB). For example, when the BV has a first component $BV[0]$ and a second component $BV[1]$, the current block has a top left position at position $(x_0, y_0)$, and each of the CTB(s) has width $CTB_{width}$ and height $CTB_{height}$, the constraint is satisfied if $BV[0] >= -((x_0 \% CTB_{width}) + CTB_{width})$ and $BV[1] >= -(y_0 \% CTB_{height})$. The encoder can similarly check upper limits on values of $BV[0]$ and $BV[1]$ within the search range: $BV[0] < (CTB_{width} - m - (x_0 \% CTB_{width}))$ and $BV[1] < (CTB_{height} - n - (y_0 \% CTB_{height}))$. Alternatively, the search range includes more or fewer CTBs, or the search range is defined in some other way.

According to another possible constraint, the encoder limits searching to the current slice and tile (i.e., the current block and region are part of no more than one slice of the picture and no more than one tile of the picture). The encoder can check that a top left position of the current block, a top left position of a candidate intra-prediction region and a bottom right position of the candidate intra-prediction region are part of a single slice and single tile. For example, the constraint is satisfied if $(x_0, y_0)$, $(x_0+BV[0], y_0+BV[1])$ and $(x_0+BV[0]+m-1, y_0+BV[1]+n-1)$ are part of a single slice and single tile.

Alternatively, the encoder checks other and/or additional constraints.

The encoder performs (2220) intra BC prediction for the current block using the BV. For example, the encoder performs intra BC prediction for the entire current block. Or, the encoder performs intra BC prediction for multiple blocks associated with the current block (e.g., for multiple TBs on a TB-by-TB basis, where the TBs are associated with a current PB that has the BV).

The encoder encodes (2230) the BV. The encoder can repeat the technique (2200) for another intra BC prediction mode block.

For intra BC prediction, the encoder and decoder use reconstructed sample values. Unreconstructed sample values might be present as parts of a picture that have not been encoded and reconstructed yet. To avoid using unreconstructed sample values for intra BC prediction, the encoder can set constraints on allowable values of BV such that only actual, previously reconstructed sample values are used for intra BC prediction according to a BV.

In some example implementations, the encoder checks a BV value by considering the z-scan orders of the current block and the block that contains the bottom right position of the candidate intra-prediction region. More specifically, the encoder checks that the z-scan order of the block containing the position $(x_0+BV[0]+m-1, y_0+BV[1]+n-1)$ is smaller than z-scan order of the block containing $(x_0, y_0)$. If so, the block that contains the bottom right position of the intra-prediction region has been previously reconstructed (and hence so has the rest of the intra-prediction region). The BV also satisfies at least one of the conditions $BV[0]+m \leq 0$ and $BV[1]+n \leq 0$, ensuring that the intra-prediction region does not overlap the current block.

Figure 23:
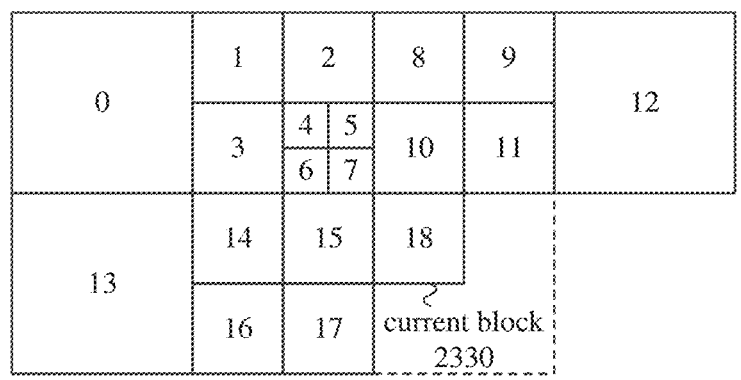
FIG. 23 is a diagram illustrating example z-scan order for blocks of a picture.

The z-scan order follows a sequentially specified ordering of blocks that partition a picture. FIG. 23 shows example z-scan order (2300) for a current block (2330) and blocks that might include the bottom right position of an intra-prediction region for a candidate BV. The current block (2330) can be a CB, PB or other block. The z-scan orders are generally assigned to blocks sequentially from left-to-right in a row, repeating in successive rows from top-to-bottom. When a block is split, z-scan orders are assigned within the split block, recursively. For implementations of encoding/decoding for the HEVC standard, the z-scan order proceeds CTB-to-CTB by a CTB raster scan pattern (left-to-right in a CTB row, repeating in successive CTB rows from top-to-bottom). If a CTB is split, the z-scan order follows a raster scan pattern for CBs of a quadtree within the split CTB. And, if a CB is split (e.g., into multiple CBs, or into multiple PBs), the z-scan order follows a raster scan pattern for blocks within the split CB.

Alternatively, when intra BC prediction can be performed on a TB-by-TB basis, the encoder and decoder can check for possible overlap between an intra-prediction region and a current block (TB), then use the results of the check to decide whether the current TB should be split into smaller TBs for application of intra BC prediction operations. Suppose a current TB has a size of m×n, where m and n can be equal to each other or can have different values. If $BV[0] > -m$ and $BV[1] > -n$, the intra-prediction region overlaps the current m×n TB, which is problematic unless the current m×n TB is split into smaller TBs for application of intra BC prediction operations. Thus, if $BV[0] > -m$ and $BV[1] > -n$, the encoder and decoder split the current TB into smaller TBs. The same condition is checked (e.g., checked recursively) for the smaller TBs, which may be further split if $BV[0] > -m$ and $BV[1] > -n$ even for the smaller values of m and n after splitting.

For example, suppose the BV for a PB is (−9, −5), and the current TB is a 32×32 block. The encoder and decoder determine that −9 > −32 and −5 > −32, indicating that the intra-prediction region (whose top left corner is displaced −9, −5) would overlap the current 32×32 TB. The encoder and decoder split the 32×32 TB into four 16×16 TBs. For each of the 16×16 TBs, the encoder and decoder determine that −9 > −16 and −5 > −16, indicating that the intra-prediction region (whose top left corner is displaced −9, −5) would overlap the current 16×16 TB. The encoder and decoder split each 16×16 TB, in succession, into four 8×8 TBs. For an 8×8 TB, the BV of (−9, −5) is not problematic, so the 8×8 TB is not forced to be further split.

In this scenario, when a TB is split due to a BV value and size of the TB, the encoder can skip signaling of the flag value that would otherwise signal whether to split the current TB into smaller TBs. The bitstream of encoded data lacks the flag value directing the decoder to split the current TB into smaller TBs. Instead, the decoder can infer that a TB should be split due to a BV value and the size of the TB. This can save bits that would otherwise be spent signaling information about splitting TBs.

As part of BV estimation, the encoder can use any of several approaches. The encoder can use a full search, evaluating every candidate BV value allowed in a search range. Or, the encoder can use a partial search, evaluating only some of the candidate BV values allowed in a search range. For example, the encoder can start a partial search at the predicted BV value for a current block (e.g., predicted based on BV values of one or more neighboring blocks). After evaluating the candidate BV value at the starting position for the partial search, the encoder can evaluate one or more other candidate BV values at increasing distances from the starting position (e.g., according to a spiral search pattern or some other pattern). Or, the encoder can use a search pattern as described in the previous section. When evaluating a given candidate BV value, the encoder can compare all sample values in the intra-prediction region and current block. Or, the encoder can evaluate a subset of the sample values (that is, sub-sample which values are evaluated). When comparing sample values between the intra-prediction region and current block to determine a distortion cost, the encoder can compute mean square error, sum of squared differences ("SSD"), sum of absolute differences ("SAD"), or some other measure of distortion. The encoder can also determine bit rate costs associated with encoding of the candidate BV value.

XI. Alternatives and Variations

In many of the examples described herein, intra BC prediction and motion compensation are implemented in separate components or processes, and BV estimation and motion estimation are implemented in separate components or processes. Alternatively, intra BC prediction can be implemented as a special case of motion compensation, and BV estimation can be implemented as a special case of motion estimation, for which the current picture is used as a reference picture. In such implementations, a BV value can be signaled as an MV value but used for intra BC prediction (within the current picture) rather than inter-picture prediction. As the term is used herein, "intra BC prediction" indicates prediction within a current picture, whether that prediction is provided using an intra-picture prediction module, a motion compensation module, or some other module. Similarly, a BV value can be represented using an MV value or using a distinct type of parameter or syntax element, and BV estimation can be provided using an intra-picture estimation module, motion estimation module or some other module.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more non-transitory computer-readable media having stored thereon computer-executable instructions for causing one or more processing units, when programmed thereby, to perform operations comprising:
   receiving a frame of a video sequence;
   splitting the frame into multiple 2N×2N blocks, the multiple 2N×2N blocks including a current 2N×2N block of the frame;
   encoding the current 2N×2N block of the frame to produce encoded data, the current 2N×2N block being within a given slice of the frame and being within a given tile of the frame, the current 2N×2N block having dimensions of 64×64, 32×32, or 16×16, including:
   constraining values of vectors for intra block copy ("BC") prediction to have integer-sample precision and to indicate reference regions that are within the given slice, within the given tile, and not overlapping the current 2N×2N block within the frame;
   asymmetrically partitioning the current 2N×2N block into first and second partitions for intra BC prediction by splitting the current 2N×2N block horizontally or vertically into the first and second partitions, the first and second partitions having dimensions of:
   (a) 64×16 and 64×48, respectively, or 16×64 and 48×64, respectively, if the current 2N×2N block has dimensions of 64×64;
   (b) 32×8 and 32×24, respectively, or 8×32 and 24×32, respectively, if the current 2N×2N block has dimensions of 32×32; and
   (c) 16×4 and 16×12, respectively, or 4×16 and 12×16, respectively, if the current 2N×2N block has dimensions of 16×16;
   performing intra BC prediction for the first partition; and
   performing intra BC prediction for the second partition; and
   outputting the encoded data as part of a bitstream.

2. The one or more computer-readable media of claim 1, wherein the values of vectors for intra BC prediction are further constrained to indicate displacements to reference regions within a search range having a horizontal bias or a vertical bias, wherein, for the horizontal bias, the search range includes candidate vector values having a wider range of horizontal component values than vertical component values, and wherein, for the vertical bias, the search range includes candidate vector values having a wider range of vertical component values than horizontal component values.

3. The one or more computer-readable media of claim 1, wherein the encoding further includes, for the current 2N×2N block:
   determining a first vector that indicates a first displacement to a first reference region of the frame;
   determining a second vector that indicates a second displacement to a second reference region of the frame;
   as part of the performing intra BC prediction for the first partition, using the first vector to determine predicted sample values for the first partition from previously reconstructed sample values in the first reference region of the frame; and
   as part of the performing intra BC prediction for the second partition, using the second vector to determine predicted sample values for the second partition from previously reconstructed sample values in the second reference region of the frame.

4. The one or more computer-readable media of claim 3, wherein the determining the first vector includes identifying the first vector subject to a constraint that the first reference region is within a search range having a horizontal bias or a vertical bias, wherein, for the horizontal bias, the search range includes candidate vector values having a wider range of horizontal component values than vertical component values, and wherein, for the vertical bias, the search range includes candidate vector values having a wider range of vertical component values than horizontal component values.

5. The one or more computer-readable media of claim 3, wherein the determining the first vector includes:
  identifying a current best location for prediction through iterative evaluation in a small neighborhood around the current best location, wherein the small neighborhood includes locations that are immediately adjacent horizontally or vertically to the current best location; and
  confirming the current best location through iterative evaluation in successively larger neighborhoods around the current best location, wherein each of the larger neighborhoods includes locations in a ring outside the small neighborhood.

6. The one or more computer-readable media of claim 1, wherein the encoding further includes performing intra BC prediction for another 2N×2N block that is symmetrically partitioned for the intra BC prediction, and wherein the other 2N×2N block is partitioned into (1) two 2N×N blocks, (2) two N×2N blocks, or (3) four N×N blocks, each of which can be further partitioned into two N×N/2 blocks, two N/2×N blocks or four N/2×N/2 blocks.

7. The one or more computer-readable media of claim 1, wherein the current 2N×2N block is split horizontally, and the first and second partitions are top and bottom partitions, respectively.

8. The one or more computer-readable media of claim 1, wherein the current 2N×2N block is split vertically, and the first and second partitions are left and right partitions, respectively.

9. The one or more computer-readable media of claim 1, wherein the asymmetrically partitioning includes identifying how to partition the current 2N×2N block using a bottom-up approach that includes:
  checking a subset of modes per N×N block of the current 2N×2N block;
  caching vector values for the respective N×N blocks of the current 2N×2N block;
  checking a subset of modes with a 2N-dimension for the current 2N×2N block, including using the cached vector values;
  selecting a best mode with a 2N-dimension for the current 2N×2N block; and
  selecting between the best mode with a 2N-dimension for the current 2N×2N block and best modes for the respective N×N blocks of the current 2N×2N block.

10. The one or more computer-readable media of claim 1, wherein the asymmetrically partitioning includes identifying how to partition the current 2N×2N block using a top-down approach that includes:
  checking modes with a 2N-dimension for the current 2N×2N block;
  selecting a best mode with a 2N-dimension for the current 2N×2N block;
  for each N×N block of the current 2N×2N block, checking modes for the N×N block;
  selecting a best combination of modes for the respective N×N blocks of the current 2N×2N block; and
  selecting between the best mode with a 2N-dimension for the current 2N×2N block and the best combination of modes for the respective N×N blocks of the current 2N×2N block.

11. In a computer system that implements video decoder, a method comprising:
  receiving encoded data as part of a bitstream; and
  decoding the encoded data to reconstruct a frame of a video sequence, including performing intra block copy ("BC") prediction for first and second partitions of a current 2N×2N block of the frame, the current 2N×2N block being within a given slice of the frame and being within a given tile of the frame, and values of vectors for the intra BC prediction being constrained to have integer-sample precision and to indicate reference regions that are within the given slice, within the given tile, and not overlapping the current 2N×2N block within the frame, the current 2N×2N block having been asymmetrically partitioned for the intra BC prediction, the current 2N×2N block having dimensions of 64×64, 32×32, or 16×16, the current 2N×2N block having been split horizontally or vertically into the first and second partitions, the first and second partitions having dimensions of:
  (a) 64×16 and 64×48, respectively, or 16×64 and 48×64, respectively, if the current 2N×2N block has dimensions of 64×64;
  (b) 32×8 and 32×24, respectively, or 8×32 and 24×32, respectively, if the current 2N×2N block has dimensions of 32×32; and
  (c) 16×4 and 16×12, respectively, or 4×16 and 12×16, respectively, if the current 2N×2N block has dimensions of 16×16.

12. The method of claim 11, wherein the decoding further includes performing intra BC prediction for another 2N×2N block that has been symmetrically partitioned for the intra BC prediction, and wherein the other 2N×2N block has been partitioned into (1) two 2N×N blocks, (2) two N×2N blocks, or (3) four N×N blocks, each of which can be further partitioned into two N×N/2 blocks, two N/2×N blocks or four N/2×N/2 blocks.

13. The method of claim 11, wherein the decoding includes, for the current 2N×2N block:
  reconstructing a first vector that indicates a first displacement to a first reference region of the frame;
  reconstructing a second vector that indicates a second displacement to a second reference region of the frame;
  as part of the performing intra BC prediction for the first partition, using the first vector to determine predicted sample values for the first partition from previously reconstructed sample values in the first reference region of the frame; and
  as part of the performing intra BC prediction for the second partition, using the second vector to determine predicted sample values for the second partition from previously reconstructed sample values in the second reference region of the frame.

14. The method of claim 11, wherein the current 2N×2N block has been split horizontally, and the first and second partitions are top and bottom partitions, respectively.

15. The method of claim 11, wherein the current 2N×2N block has been split vertically, and the first and second partitions are left and right partitions, respectively.

16. One or more non-transitory computer-readable media having stored thereon encoded data as part of a bitstream, the encoded data being organized to facilitate decoding, with a computer system that implements a video decoder, by operations comprising:
  receiving the encoded data; and
  decoding the encoded data to reconstruct a frame of a video sequence, including performing intra block copy ("BC") prediction for first and second partitions of a current 2N×2N block of the frame, the current 2N×2N block being within a given slice of the frame and being within a given tile of the frame, and values of vectors for the intra BC prediction being constrained to have integer-sample precision and to indicate reference regions that are within the given slice, within the given tile, and not overlapping the current 2N×2N block within the frame, the current 2N×2N block having been asymmetrically partitioned for the intra BC prediction, the current 2N×2N block having dimensions of 64×64, 32×32, or 16×16, the current 2N×2N block having been split horizontally or vertically into the first and second partitions, the first and second partitions having dimensions of:
- (a) 64×16 and 64×48, respectively, or 16×64 and 48×64, respectively, if the current 2N×2N block has dimensions of 64×64;
- (b) 32×8 and 32×24, respectively, or 8×32 and 24×32, respectively, if the current 2N×2N block has dimensions of 32×32; and
- (c) 16×4 and 16×12, respectively, or 4×16 and 12×16, respectively, if the current 2N×2N block has dimensions of 16×16.

17. The one or more computer-readable media of claim 16, wherein the decoding further includes performing intra BC prediction for another 2N×2N block that has been symmetrically partitioned for the intra BC prediction, and wherein the other 2N×2N block has been partitioned into (1) two 2N×N blocks, (2) two N×2N blocks, or (3) four N×N blocks, each of which can be further partitioned into two N×N/2 blocks, two N/2×N blocks or four N/2×N/2 blocks.

18. The one or more computer-readable media of claim 16, wherein the decoding includes, for the current 2N×2N block:
- reconstructing a first vector that indicates a first displacement to a first reference region of the frame;
- reconstructing a second vector that indicates a second displacement to a second reference region of the frame;
- as part of the performing intra BC prediction for the first partition, using the first vector to determine predicted sample values for the first partition from previously reconstructed sample values in the first reference region of the frame; and
- as part of the performing intra BC prediction for the second partition, using the second vector to determine predicted sample values for the second partition from previously reconstructed sample values in the second reference region of the frame.

19. The one or more computer-readable media of claim 16, wherein the current 2N×2N block has been split horizontally, and the first and second partitions are top and bottom partitions, respectively.

20. The one or more computer-readable media of claim 16, wherein the current 2N×2N block has been split vertically, and the first and second partitions are left and right partitions, respectively.

* * * * *